(12) United States Patent
Sawahata et al.

(10) Patent No.: US 11,798,212 B2
(45) Date of Patent: Oct. 24, 2023

(54) CONTENT GENERATION METHOD FOR ELECTRONIC BOOKS AND COMPUTER-READABLE MEDIUM

(71) Applicant: CELSYS, INC., Tokyo (JP)

(72) Inventors: Akira Sawahata, Tokyo (JP); Tomoaki Yokotsuka, Tokyo (JP)

(73) Assignee: CELSYS, INC., Tokyo (JP)

( * ) Notice: Subject to any disclaimer, the term of this patent is extended or adjusted under 35 U.S.C. 154(b) by 0 days.

(21) Appl. No.: 17/664,871

(22) Filed: May 25, 2022

(65) Prior Publication Data

US 2022/0284645 A1    Sep. 8, 2022

Related U.S. Application Data

(63) Continuation of application No. PCT/JP2021/002487, filed on Jan. 25, 2021.

(30) Foreign Application Priority Data

Apr. 17, 2020 (JP) ................................. 2020-074198

(51) Int. Cl.
*G06T 11/60* (2006.01)
*G06F 3/0483* (2013.01)
(Continued)

(52) U.S. Cl.
CPC ............ *G06T 11/60* (2013.01); *G06F 3/0483* (2013.01); *G06F 40/106* (2020.01); *G06F 40/186* (2020.01)

(58) Field of Classification Search
CPC .... G06T 11/60; G06F 3/0483; G06F 3/04847; G06F 8/38; G06F 9/451;
(Continued)

(56) References Cited

U.S. PATENT DOCUMENTS 7,590,955 B1 *  9/2009  Nequist ................. G06F 30/398
                                            716/136
8,595,662 B1 * 11/2013  Yu ........................... G06F 30/39
                                            716/110
(Continued)

FOREIGN PATENT DOCUMENTS

CN      102087749 A      6/2011
JP      2002259111 A     9/2002
(Continued)

OTHER PUBLICATIONS

Office Action in Japanese Application No. 2020-074198 dated Jul. 21, 2020, 10pp.

*Primary Examiner* — Jin Cheng Wang
(74) *Attorney, Agent, or Firm* — HAUPTMAN HAM, LLP

(57) ABSTRACT

A method is provided for placing a first content and a second content on a display screen at a distance D along a Y-axis in an orthogonal coordinate system formed by an X-axis and the Y-axis. The method includes identifying, in the first content, a first non-display-target region which is located on the second content side, identifying, in the second content, a second non-display-target region which is located on the first content side, calculating a plurality of total widths each of which is a sum of a width of the first non-display-target region in a direction of the Y-axis and a width of the second non-display-target region in the direction of the Y-axis, the widths being at a same X-coordinate, and determining the distance D based on the plurality of total widths and a predetermined reference.

7 Claims, 28 Drawing Sheets

(51) Int. Cl.
*G06F 40/106* (2020.01)
*G06F 40/186* (2020.01)

(58) Field of Classification Search
CPC ......... G06F 2203/04803; G06F 40/106; G06F 40/12; G06F 40/166
See application file for complete search history.

(56) References Cited

U.S. PATENT DOCUMENTS

| | | | |
|---|---|---|---|
| 10,078,723 B1* | 9/2018 | Ghosh | G06F 30/398 |
| 2002/0122039 A1 | 9/2002 | Minagawa et al. | |
| 2004/0210707 A1 | 10/2004 | Ohara et al. | |
| 2006/0190811 A1* | 8/2006 | Ohno | G06F 40/106 |
| | | | 715/255 |
| 2006/0190847 A1* | 8/2006 | Yang | G06F 30/392 |
| | | | 716/122 |
| 2007/0126793 A1* | 6/2007 | Yamakado | G06F 40/106 |
| | | | 347/43 |
| 2008/0195937 A1* | 8/2008 | Yamakado | G06F 40/103 |
| | | | 715/246 |
| 2009/0172625 A1* | 7/2009 | Nequist | G06F 30/398 |
| | | | 716/122 |
| 2011/0138271 A1 | 6/2011 | Tobita | |
| 2013/0086458 A1 | 4/2013 | Kurata et al. | |
| 2013/0147794 A1* | 6/2013 | Lee | G06F 3/04842 |
| | | | 345/419 |
| 2017/0235473 A1* | 8/2017 | Han | G06F 13/38 |
| | | | 715/771 |
| 2018/0088881 A1* | 3/2018 | Kuronuma | B41J 3/36 |
| 2018/0321821 A1* | 11/2018 | Qian | G06T 11/60 |
| 2019/0147022 A1* | 5/2019 | Okada | G06F 40/143 |
| | | | 715/234 |
| 2021/0073458 A1 | 3/2021 | Sugaya | |

FOREIGN PATENT DOCUMENTS

| | | |
|---|---|---|
| JP | 2002279396 A | 9/2002 |
| JP | 2004246866 A | 9/2004 |
| JP | 2004342002 A | 12/2004 |
| JP | 201377982 A | 4/2013 |
| KR | 1020130016080 A | 2/2013 |
| WO | 2019130492 A1 | 7/2019 |

* cited by examiner

CONTENT GENERATION METHOD FOR ELECTRONIC BOOKS AND COMPUTER-READABLE MEDIUM

CROSS REFERENCE OF RELATED APPLICATION

This application is a continuation of International Application Serial No. PCT/JP2021/002487, filed Jan. 25, 2021, which claims priority to Japanese Patent Application No. 2020-074198, filed Apr. 17, 2020. The contents of these applications are incorporated herein by reference in their entirety.

BACKGROUND

Technical Field

The present disclosure relates to a content generation method for electronic books and a non-transitory computer-readable medium storing a content generation program for electronic books.

Background Art

There are techniques for displaying a book having a plurality of contents, such as a comic book including a plurality of partial regions (frames), on a display screen of a mobile terminal or the like.

For example, there is a technique in which frame number data representing the order to display comic book frame images each of which is represented by frame data is stored so that, based on the frame number data, the comic book frame images represented by the frame data are displayed on the display screen of a display device one frame at a time (see, for example, Japanese Patent Application Publication No. 2002-279396).

There is also a technique in which frames of one page are displayed on a screen, and either fade-in processing or fade-out processing is performed on a predetermined one of the frames displayed (see, for example, Japanese Patent Application Publication No. 2002-259111).

There is also a technique which includes a frame determination means that forms a plurality of graphic frames by dividing a base sheet and displays the plurality of frames formed by the frame determination means (see, for example, Japanese Patent Application Publication No. 2004-342002).

SUMMARY

The technique disclosed herein has an object to provide an electronic book in a more easy-to-read manner by improving how the electronic book having a plurality of contents, such as a comic book including a plurality of partial regions (frames), is displayed on a display screen of a mobile terminal or the like.

A disclosed technique provides a method in which a computer places a first content and a second content on a display screen at a distance D along a Y-axis in an orthogonal coordinate system formed by an X-axis and the Y-axis orthogonal to each other, the first content including a first display target, the second content including a second display target, the method including: identifying a first non-display-target region which is part of a non-display-target region obtained by excluding a region of the first display target from a region of the first content and which is located on the second content side; identifying a second non-display-target region which is part of a non-display-target region obtained by excluding a region of the second display target from a region of the second content and which is located on the first content side; calculating a plurality of total widths each of which is a sum of a width of the first non-display-target region in a direction of the Y-axis and a width of the second non-display-target region in the direction of the Y-axis, the widths being at a same X-coordinate; and determining the distance D based on the plurality of total widths and a predetermined reference.

The disclosed technique makes it possible to provide an electronic book in a more easy-to-read manner by improving how the electronic book having a plurality of contents, such as a comic book including a plurality of partial regions (frames), is displayed on a display screen of a mobile terminal or the like.

DETAILED DESCRIPTION

An embodiment is described below with reference to the drawings.

Figure 1:
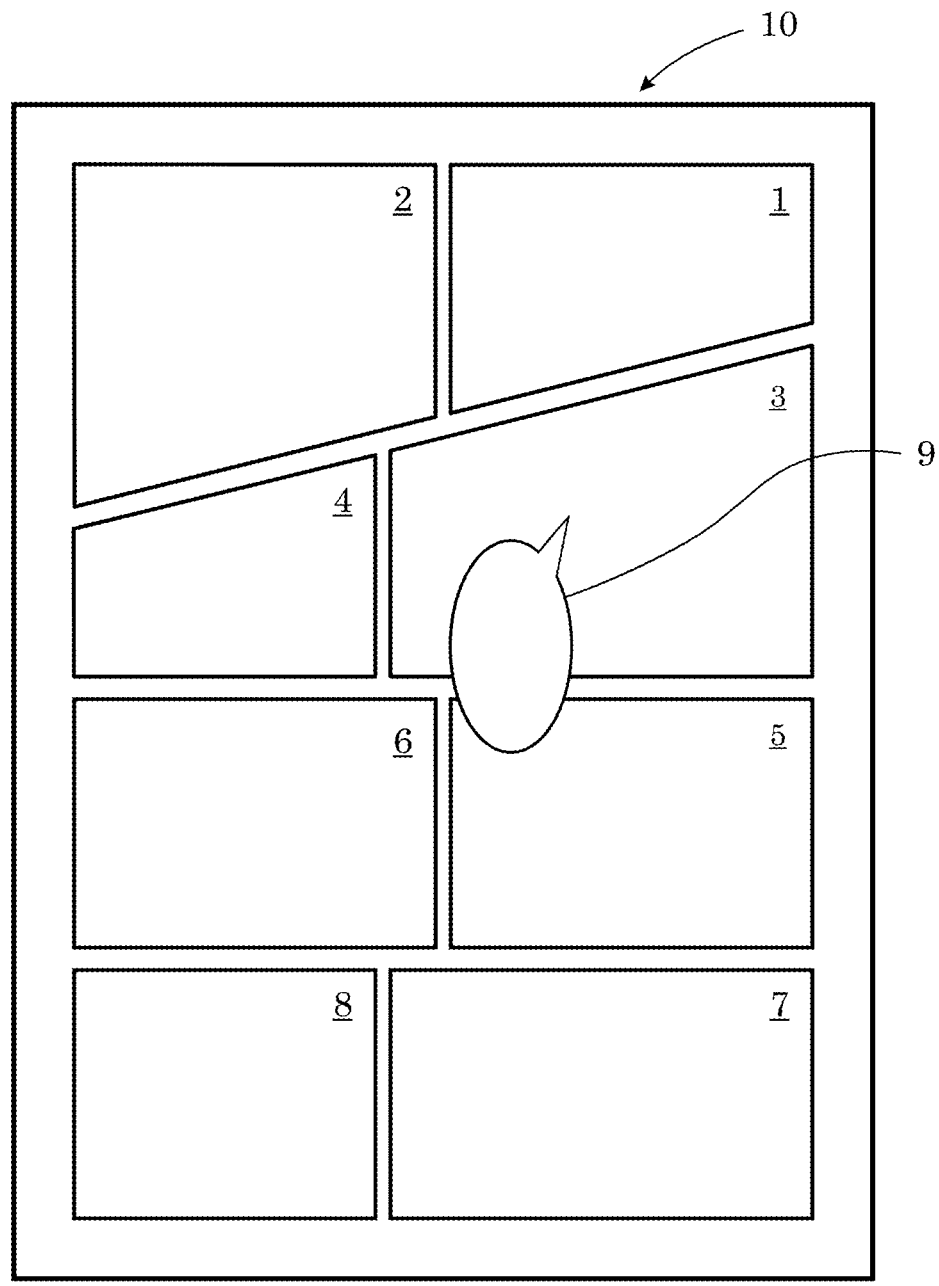
FIG. 1 is a diagram showing an example of a frame arrangement in a comic book.

FIG. 1 is a diagram showing an example of a frame arrangement 10 in a comic book. The frame numbers assigned to frames 1 to 8 indicate the order in which the story of the comic book is told. In the frame arrangement 10 of a comic book, if there is a space on the left side of the frame 1 within one page, the frame 2 is placed on the left, like in a comic book printed on a paper medium. Since there is no space left on the left side of the frame 2, the frames 3 and 4 are placed side by side under the frames 1 and 2. In this way, in a case where a plurality of frames are placed within one page, an arrangement like the one shown in FIG. 1 is used in many cases.

However, if the entire frame arrangement 10 is displayed on a screen with a small display region, such as on a mobile terminal, each frame is displayed small. For this reason, to display a comic book in the order of the story on a mobile terminal, it may be necessary to rearrange the frames so that, for example, they line up vertically. By being rearranged to line up vertically, the frames can be displayed sequentially using vertical scroll. Moreover, each frame is displayed bigger on the display screen, which is easier to read.

To thus lay out frames of a comic book vertically, it is desirable to adjust the spacing between the frames to make them easy to read. For example, the frame 3 has a speech bubble 9 added thereto. In this case, it is desirable that the spacing between the set of the frame 3 and the speech bubble 9 and the frame 4 rearranged to be under the set of the frame 3 and the speech bubble 9 be determined with the speech bubble 9 taken into account.

In the following description, an object to be displayed, such as a frame and a speech bubble that is added thereto, is called a display target. Then, in the following embodiment, a content is formed by a region including a display-target region and a non-display-target region.

The following describes an example embodiment of placing contents so that when the contents are vertically laid out, the spacing between adjacent display targets may be suitable spacing.

Although contents are vertically laid out as an example in the embodiment, it goes without saying that the method shown in the embodiment can also be applied similarly when contents are laid out horizontally.

Figure 2:
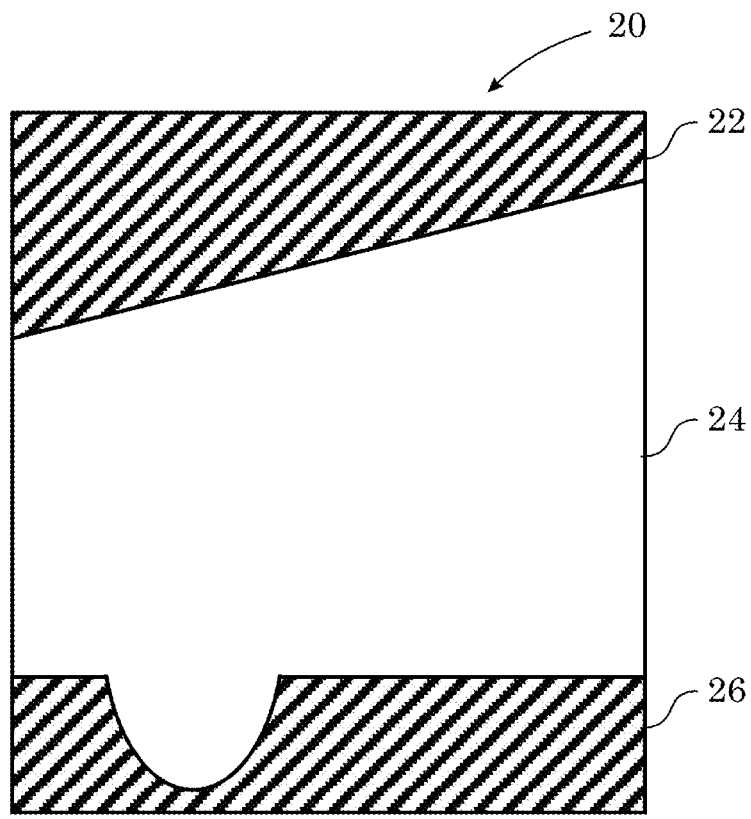
FIG. 2 is a diagram showing a content in a comic book.

FIG. 2 is a diagram showing a content 20 in a comic book. The content 20 includes a display-target region 24 and non-display-target regions 22 and 26. The display-target region 24 has the frame 3 including the speech bubble 9 in FIG. 1.

In the present embodiment, a region to be displayed, like the frame 3 including the speech bubble 9, is called a display-target region, and a lump formed by a display-target region and a non-display-target region is called a content.

Figure 3:
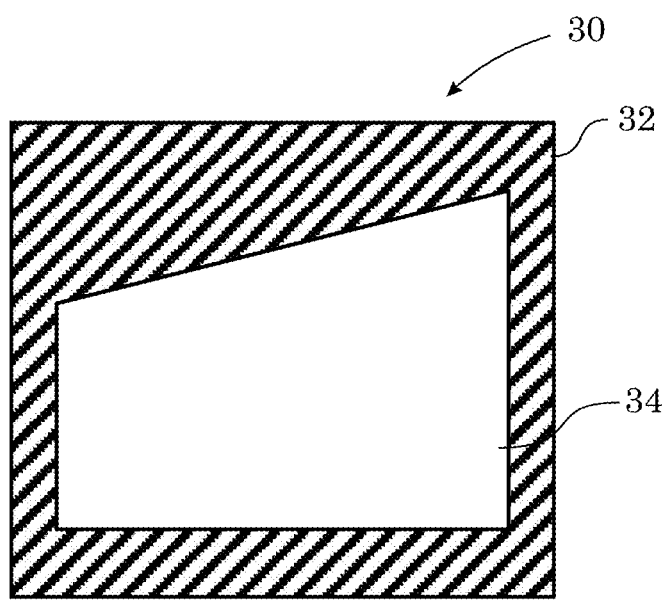
FIG. 3 is a diagram showing a content in a comic book.

FIG. 3 is a diagram showing a content 30 in a comic book. The content 30 includes a display-target region 34 and non-display-target region 32. The display-target region 34 has the frame 4 in FIG. 1.

As shown in FIGS. 2 and 3, each of the contents includes a display-target region and a non-display-target region. If a display target in each content is relatively small, a non-display-target region may be increased relatively to make the contents have substantially the same size. It goes without saying that a content may be an image formed by pixels, an image formed of vector data, or an image combining both.

Note that in the embodiment shown below, when a plurality of contents are placed in an overlapping manner, in order for a non-display-target region included in one content not to cover and hide a display-target region in another content, it is desirable that the non-display-target region be located behind the display-target region or that the non-display-target region be transparent.

Figure 4A:
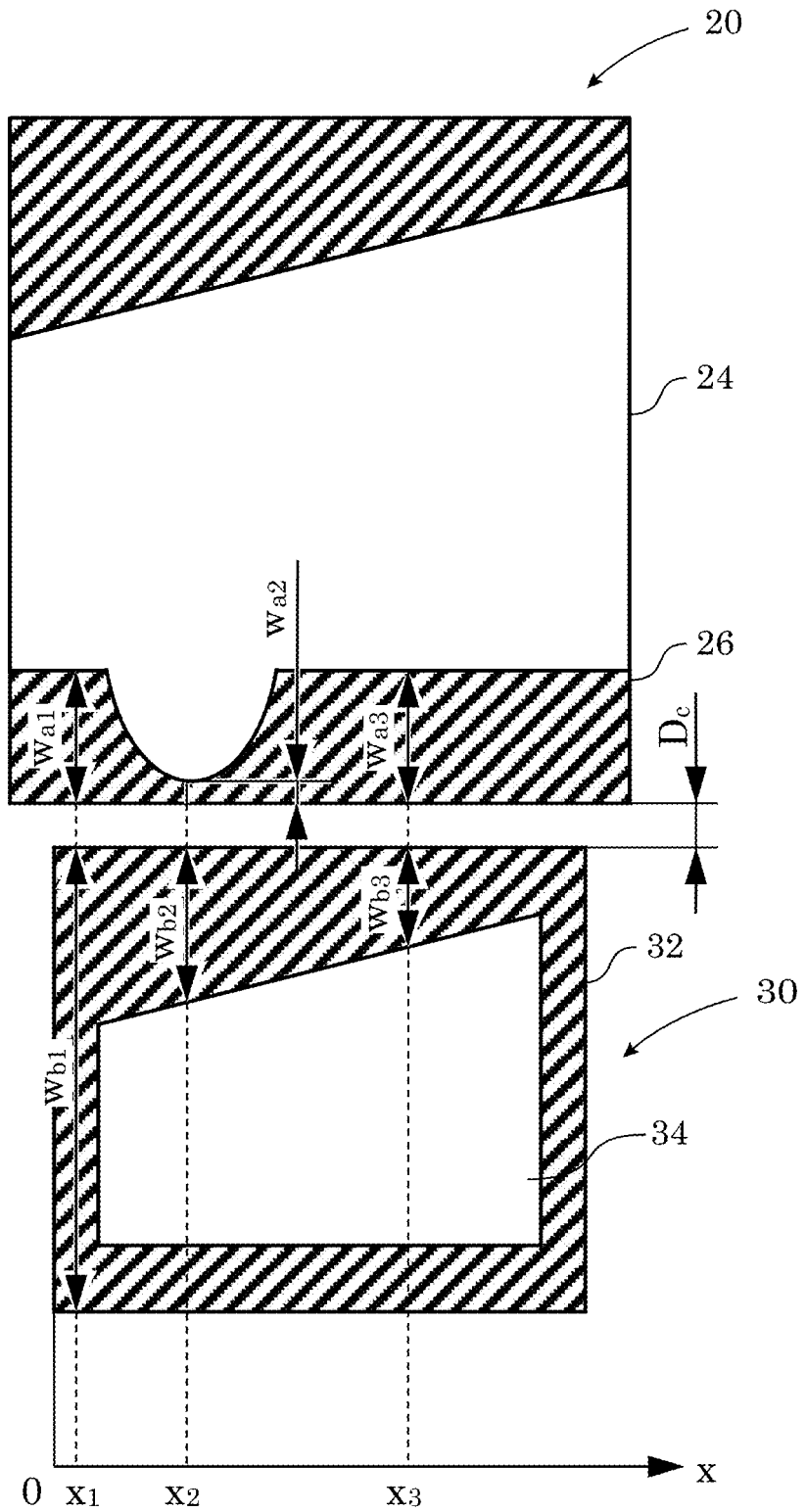
FIG. 4A is a diagram showing the total sums of the widths of non-display-target regions of the two contents laid out vertically.

FIG. 4A is a diagram showing the total sums of the vertical widths of the non-display-target regions of the content 20 and the content 30 laid out vertically (the Y-axis direction). Although an example where the contents are laid out vertically is described in the embodiment shown in FIG. 4A, it goes without saying that the method described below can also be similarly applied to a case of laying out two contents horizontally. Here, a Y-axis is a direction in which contents are sequentially placed, and an X-axis is an axis orthogonal to the Y-axis.

When the content 20 and the content 30 are laid out vertically with a distance $D_c$ in between, the distance $D_c$ is set to a suitable distance, and as a result, the display-target region 24 and the display-target region 34 are placed with a suitable distance in between. In the embodiment below, an example of determining this distance $D_c$ is shown.

Although the content 20 and the content 30 have horizontal borders (or face with lines parallel to the X-axis), it goes without saying that the borders of the content and the content 30 do not necessarily have to be horizontal. Also, although each content is rectangular in the example in FIG. 4A, contents may be other shapes than rectangles. Examples of non-rectangular contents will be described later using FIG. 16A to FIG. 20D.

The embodiment described below may be employed as long as content borders adjacent to each other have approximately the same shape. This example will be described using FIG. 16B.

In FIG. 4A, the content 20 and the content 30 desirably have a relative horizontal (X-axis direction) positional relation such that the centers of the respective contents coincide on the X-axis (the contents are centered). Then, the centers of the display-target region 24 and the display-target region 34 substantially align in the X-axis direction. Thus, when the screen where the content 20 and the content 30 are placed is scrolled vertically, the centers of the two contents are substantially aligned with the Y-axis, allowing the two contents to be displayed sequentially in a more easy-to-view manner. Note that the positioning of a plurality of contents in the X-axis direction is not limited to the above example, and the contents may be aligned to the right or to the left. Alternatively, a display target in a content may be aligned to the right or to the left. Alternatively, the area centroid of a display target in a content may be aligned to the X-axis.

In FIG. 4A, to find a more suitable distance $D_c$, first, among non-display-target regions, a non-display-target region that faces an opposite content is focused on, and the sums of the widths of the non-display-target regions in the Y-axis direction are found for the respective same X-axis values. The sums are, for example, as follows.

$$W_{bg}(x_1) = w_{a1} + w_{b1}$$

$$W_{bg}(x_2) = w_{a2} + w_{b2}$$

$$W_{bg}(x_3) = w_{a3} + w_{b3}$$

Here, $W_{bg}(x_1)$ is the sum of a Y-axis direction width $w_{a1}$ of a non-display-target region in the content 20 at $x_1$ and a Y-axis direction width $w_{b1}$ of a non-display-target region in the content 30 at $x_1$. $W_{bg}(x_2)$ and $W_{bg}(x_3)$ can be obtained similarly.

$W_{bg}$ is an example of a total width.

Note that since the content 30 has a non-display-target region also on the left and right sides of the display target, lab' is the value of the maximum width of the non-display-target region.

Figure 4B:
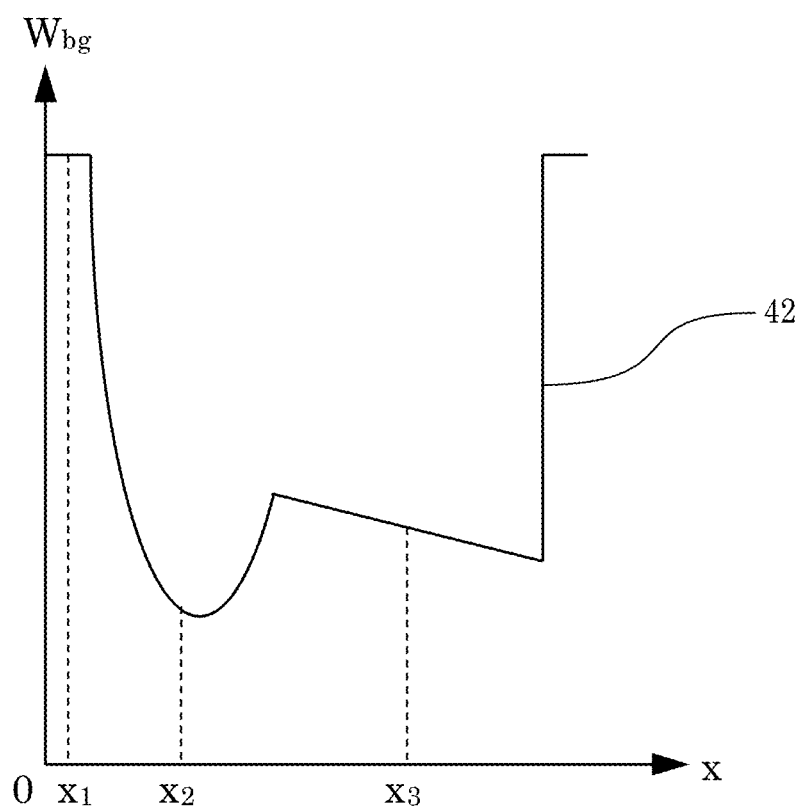
FIG. 4B is a graph representing total sums.

FIG. 4B is a graph 42 having X-axis direction positions plotted on the X-axis and values of $W_{bg}$ plotted on the Y-axis.

Figure 5:
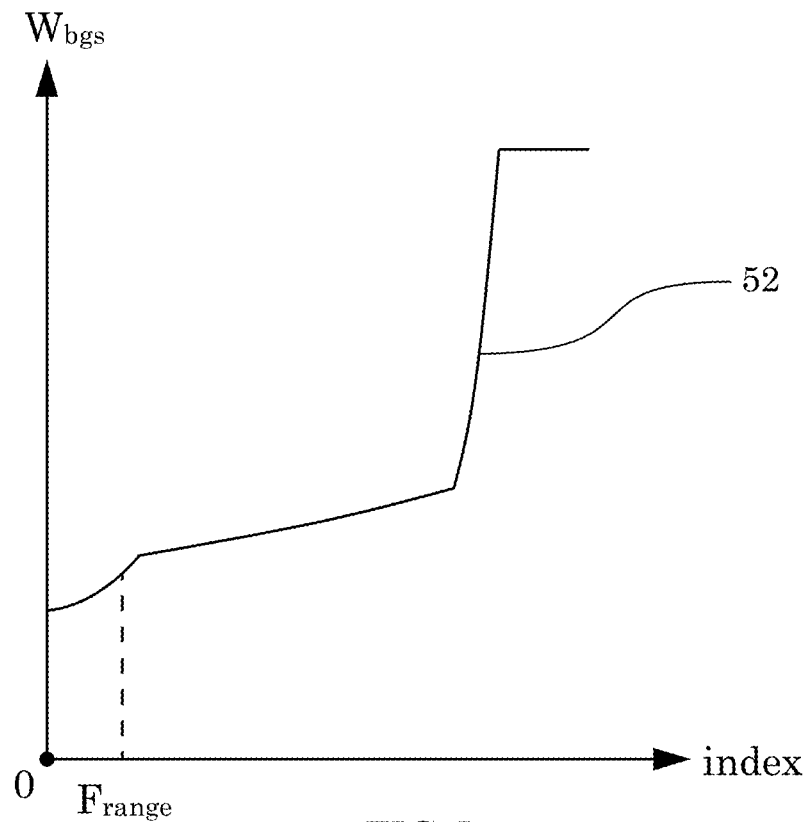
FIG. 5 is a graph in which a plurality of total sums are rearranged in ascending order of their values.

FIG. 5 is a graph 52 which is a re-plot in which $W_{bgs}$ is the values of $w_{bg}$ sorted in ascending order on a pixel basis and is set to the Y-axis, and the value of an index represents the order of the sorted values and is set to the X-axis. The graph 52 in FIG. 5 is a result of sorting and therefore always monotonically increases.

As will be detailed below, it is desirable that the distance $D_c$ between contents be determined focusing on the values of $W_{bg}$ from zero to a predefined $F_{range}$ on the X-axis. Note that the $F_{range}$ may be changed based on an operator's instruction. In other words, from zero to $F_{range}$ on the X-axis indicating the index, $W_{bg}$ has a small value, meaning that the distance between the display-target region 24 and the display-target region 34 is a small value. Thus, when $F_{range}$ is small, the total sums $W_{bg}$ having small values are used preferentially. Conversely, when the value of $F_{range}$ is large, the degree by which the total sums $W_{bg}$ having small values are used preferentially lowers.

Thus, by focusing on the values in the graph 52 from zero to $F_{range}$ on the X-axis, it is possible to focus on a part where the distance between display targets is narrow. When the distance between display targets is too short (or too long), the degree by which the distance between the display targets appears unnatural increases. By focusing on the values in the graph 52 from zero to $F_{range}$ on the X-axis, the frames in a comic book can be placed with natural distances in between.

The embodiment shown below allows the spacing between the display-target region 24 and the display-target region 34 to be suitable by setting a suitable value to the distance $D_c$ between the content 20 and the content 30 shown in FIG. 4A.

By adjusting the value of $F_{range}$, among groups of $W_{bg}$ having varying distribution, the size of a group of $W_{bg}$ having small values can be adjusted. The smaller the $F_{range}$ is, the smaller the values of $W_{bg}$ that are used preferentially are.

Figure 6:
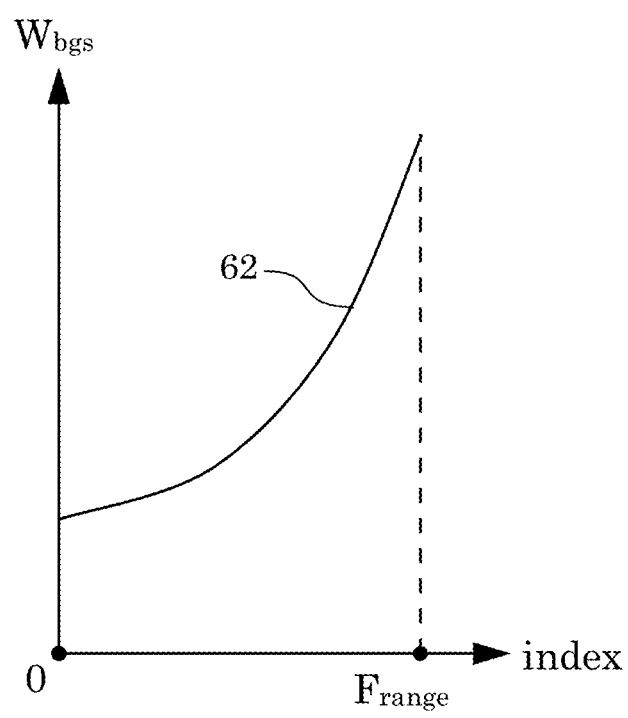
FIG. 6 is a graph showing a portion of FIG. 5 having the plurality of total sums with small values.

FIG. 6 shows a graph 62 which is a cutout from the graph 52 in FIG. 5 for a portion up to $F_{range}$ on the X-axis. In the embodiment below, an example is described of processing for determining the distance $D_c$ in accordance with the shape of the graph 62 which is a cutout of a portion from zero to $F_{range}$ on the X-axis.

Note that in a case where the contours of the non-display-target regions are formed of vector data, continuous quantity may be used in the processing instead of discrete quantity, or instead of a pixel, a unit distance corresponding to a pixel width may be used and defined for, for example, one increment of the index, so that processing performed when the contours are formed by pixels may be performed similarly.

Figure 7:
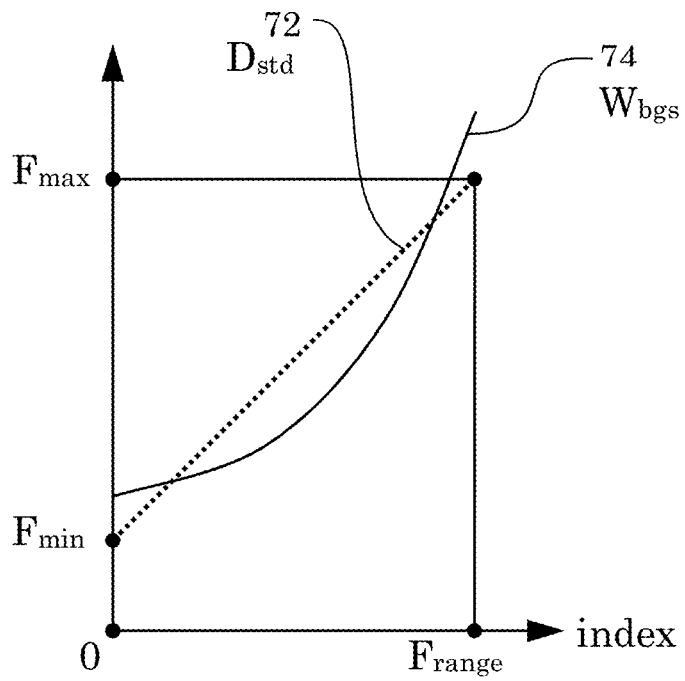
FIG. 7 is a graph showing the relation between a predetermined reference and the plurality of total sums.

FIG. 7 is a graph showing the relation between a predetermined reference and a plurality of total sums. A predefined reference value $D_{std}$ 72 shows an example of desirable reference values for the index between zero and $F_{range}$. A curve $D_{std}$ 72 is a function of the value of the index on the X-axis and is, in the example shown, a straight line having the value of $F_{min}$ when the index is zero and the value of $F_{max}$ when the index is $F_{range}$.

As an example, $D_{std}$ 72 is a straight line with a slope of 1, and is set, for example, as follows: $F_{min}=20$ pixels, $F_{max}=100$ pixels, and $F_{range}=F_{max}-F_{min}=80$ pixels. Note that this example is merely an example, and it goes without saying that the values change depending on the pixel resolution of the contents.

The curve $D_{std}$ 72 in FIG. 7 is an example showing a limit at which a user can view two display targets not too close to each other in distance. Note that the limit at which a user can view two display targets not too close to each other in distance depends on the subjective sense of each user, and therefore, the curve $D_{std}$ 72 in FIG. 7 is illustrative and not restrictive.

Figure 8:
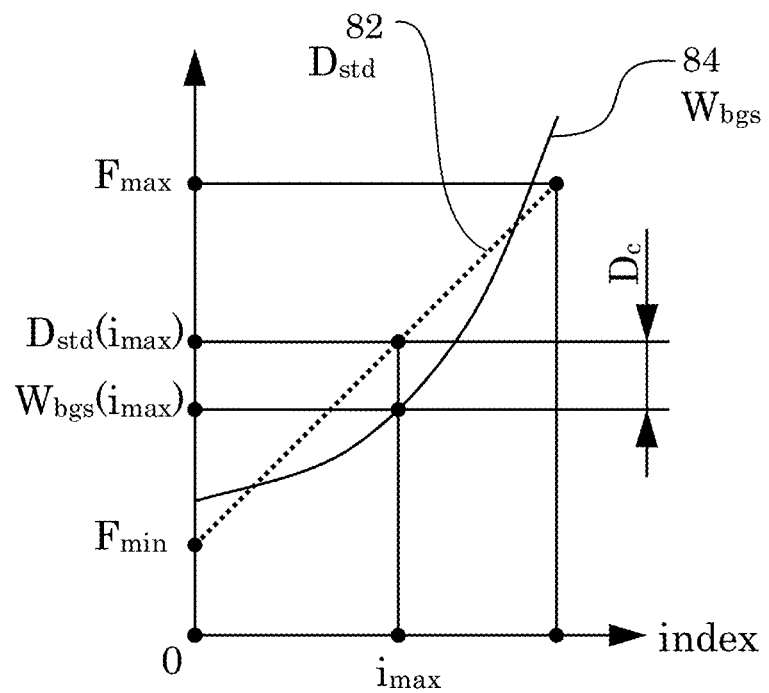
FIG. 8 is an example graph showing the difference between a predetermined reference and total sums.

FIG. 8 is an example graph showing the difference between a curve $D_{std}$ 82 as a predetermined reference and total sums $W_{bgs}$ 84.

In the present embodiment, the value of an index $i_{max}$ where $D_{std}-W_{bgs}$ is the largest is found. Then, as shown in Formula (1) below, $D_c$ is the difference between a reference value $D_{std}(i_{max})$ at $i_{max}$ and a total sum $W_{bgs}(i_{max})$ of the widths of non-display target regions in the Y-axis direction at $i_{max}$.

$$D_c = D_{std}(i_{max}) - W_{bgs}(i_{max}) \qquad \text{Formula (1)}$$

Setting the distance between contents to $D_c$ corresponds to setting the distance between the two display targets at the point where $W_{bgs}$ 84 (or $W_{bg}$ 42) is at $W_{bgs}(i_{max})$ to $D_{std}(i_{max})$. When the distance between contents is $D_c$, the distance between the display targets in the respective two contents can be set to a distance which does not bring a sense of incongruity to the user. Note that specific examples of the distance $D_c$ between contents will be described later using FIG. 13A and the like.

Figure 9:
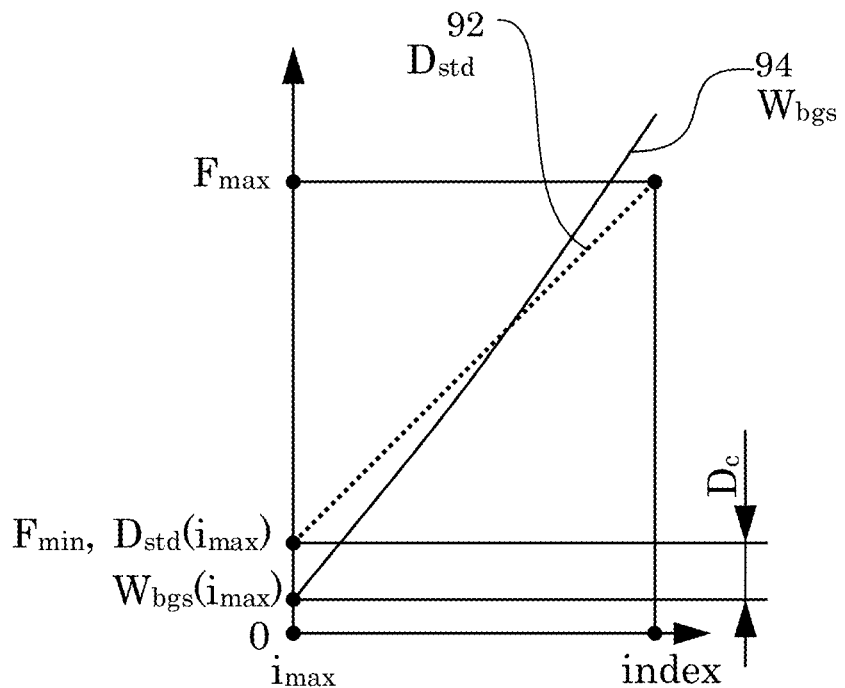
FIG. 9 is another example graph showing the difference between a predetermined reference and total sums.

FIG. 9 is an example graph showing the difference between a curve $D_{std}$ 92 as a predetermined reference and total sums $W_{bgs}$ 94. The state where the slope of $W_{bgs}$ is steep as shown in FIG. 9 occurs when a display-target region located close to the side where the two display targets face each other has a projecting portion and when the projecting portion is acute. Thus, in this case, the value of the index $i_{max}$ at which $D_{std}-W_{bgs}$ is the largest is small, and the value of $D_{std}(i_{max})$ is also small.

Note that even in a case where the projecting portion is acute, the reference value for the placement spacing changes depending on the size of the projecting portion. When the range of the projecting portion is about the same as or larger than $F_{range}$, the slope of $W_{bgs}$ is steep over the entire region from 0 to $F_{range}$ of the index as shown in FIG. 9. Thus, the value of $D_{std}(i_{max})$ is small.

In the case in FIG. 9, the value of $D_{std}(i_{max})-W_{bgs}(i_{max})$ is the largest when the value of $i_{max}$ is zero. In this case, setting the distance between contents to $D_c$ using Formula (1) corresponds to setting the distance between two display targets at the location where $W_{bgs}$ 94 (or $W_{bg}$ 42) is $W_{bgs}(i_{max})$ to $D_{std}(i_{max})$ In the case in FIG. 9, $D_{std}(i_{max})=F_{min}$, and therefore the spacing at the location where the two display targets are closest to each other is $F_{min}$, which means that the two display targets do not overlap with each other.

Figure 10:
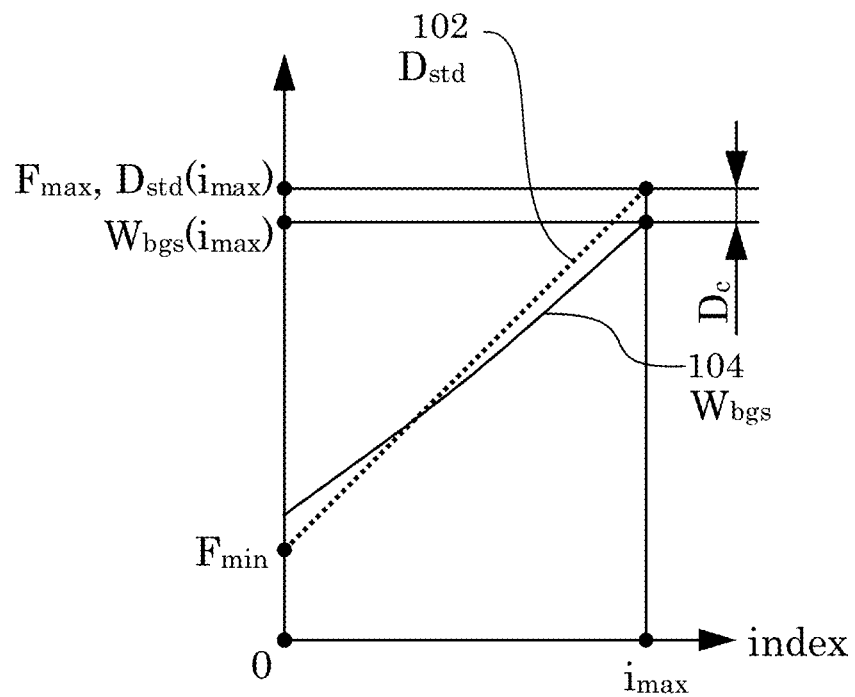
FIG. 10 is another example graph showing the difference between a predetermined reference and total sums.

FIG. 10 is an example graph showing the difference between a curve $D_{std}$ 102 as a predetermined reference and total sums $W_{bgs}$ 104. The state where the slope of $W_{bgs}$ is gentle as shown in FIG. 10 occurs when a display-target region located close to the side where the two display targets face each other either does not have a projecting portion or has a projecting portion which is not acute. Thus, in this case, the value of the index $i_{max}$ at which $D_{std}-W_{bgs}$ is the largest is larger than the case in FIG. 9, and the value of $D_{std}(i_{max})$ is also larger. In this case, setting the distance between contents to $D_c$ using Formula (1) corresponds to setting the distance between two display targets at the location where $W_{bgs}$ 104 (or $W_{bg}$ 42) is $W_{bgs}(i_{max})$ to $D_{std}(i_{max})$ In the case in FIG. 10, $D_{std}(i_{max})=F_{max}$, and therefore the spacing at the location where the two display targets are closest to each other is larger than $F_{min}$.

Figure 11:
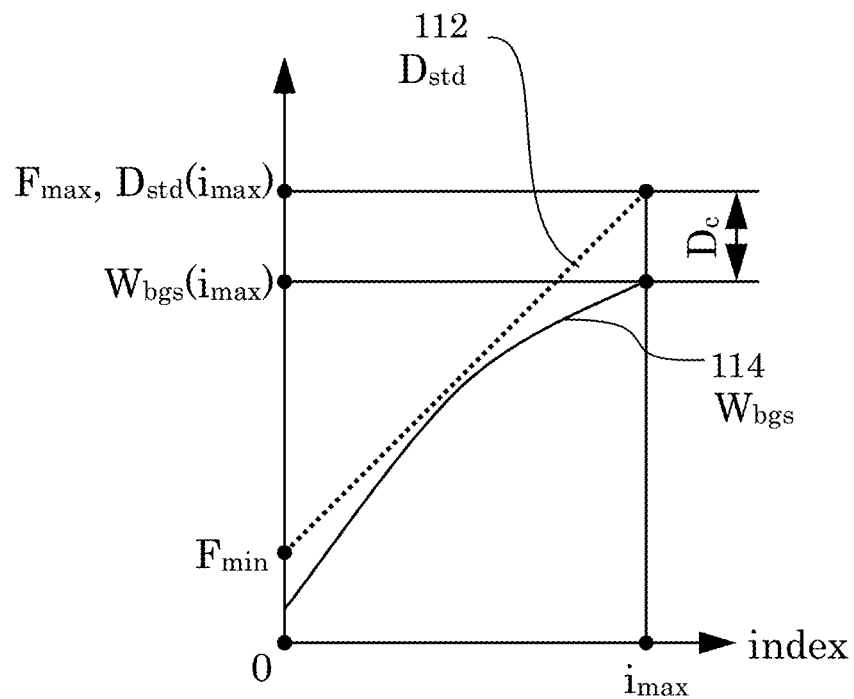
FIG. 11 is another example graph showing the difference between a predetermined reference and total sums.

FIG. 11 is an example graph showing the difference between a curve $D_{std}$ 112 as a predetermined reference and total sums $W_{bgs}$ 114. When the range of a projecting portion is smaller than $F_{range}$, the slope of the curve $W_{bgs}$ 114 becomes gentler as the index increases, as shown in FIG. 11. In other words, when the range of the projecting portion is smaller than $F_{range}$, the slope of $W_{bgs}$ is steep only in the region where the index is small and is gentle in the region where the index is large. In the case in FIG. 11, the value of $i_{max}$ is large, and the value of $D_{std}(i_{max})$ is large. In the case in FIG. 11, $D_{std}(i_{max})=F_{max}$, and therefore the spacing at the location where the two display targets are closest to each other is larger than $F_{min}$.

Figure 12:
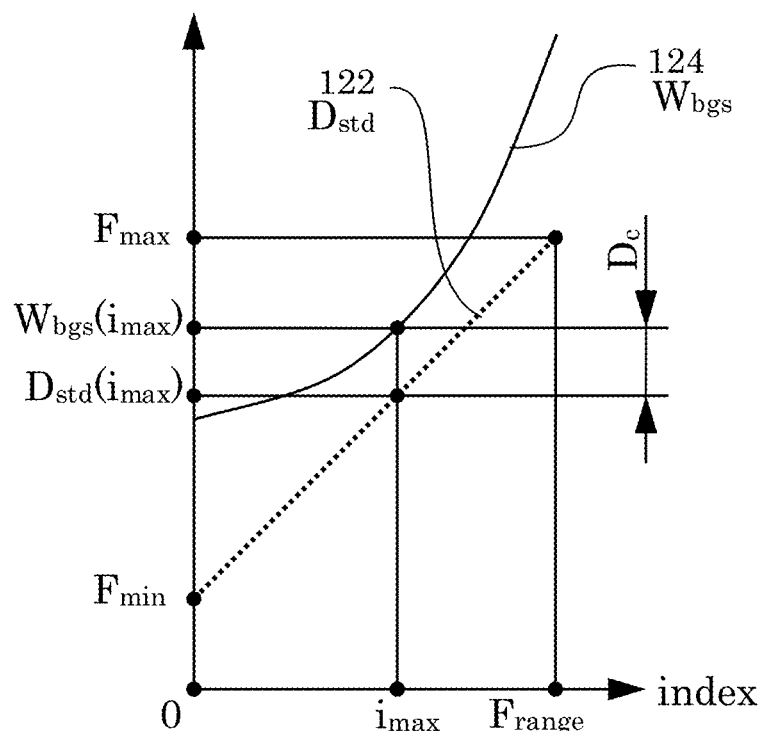
FIG. 12 is another example graph showing the difference between a predetermined reference and total sums.

FIG. 12 is an example graph showing the difference between a curve $D_{std}$ 122 as a predetermined reference and total sums $W_{bgs}$ 124. FIG. 12 shows a case where the value of $D_{std}(i_{max})-W_{bgs}(i_{max})$ is negative. Because $D_{std}(i_{max})<W_{bgs}(i_{max})$, i.e., $D_{std}(i_{max})-W_{bgs}(i_{max})<0$, the distance $D_c$ between contents calculated using Formula (1) is a negative value.

Figure 13A:
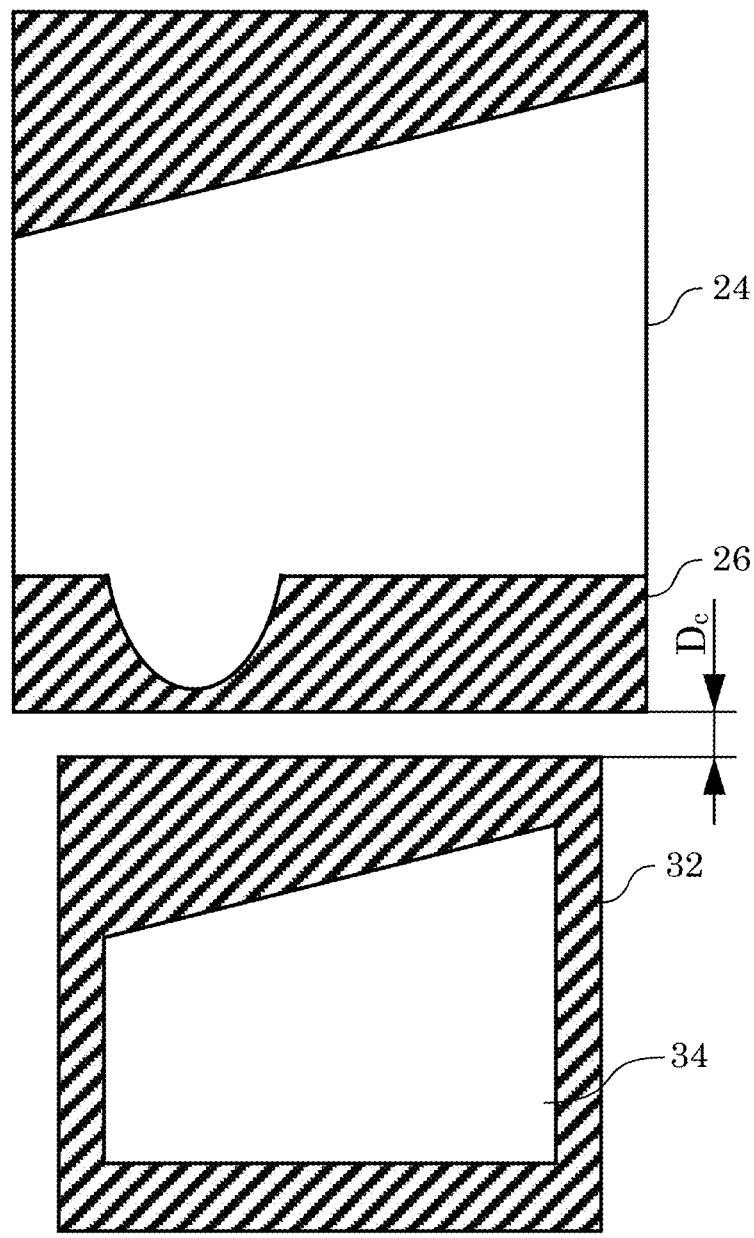
FIG. 13A is a diagram showing an example of a distance between contents.

FIG. 13A is a diagram showing an example of the distance $D_c$ between contents.

Figure 13B:
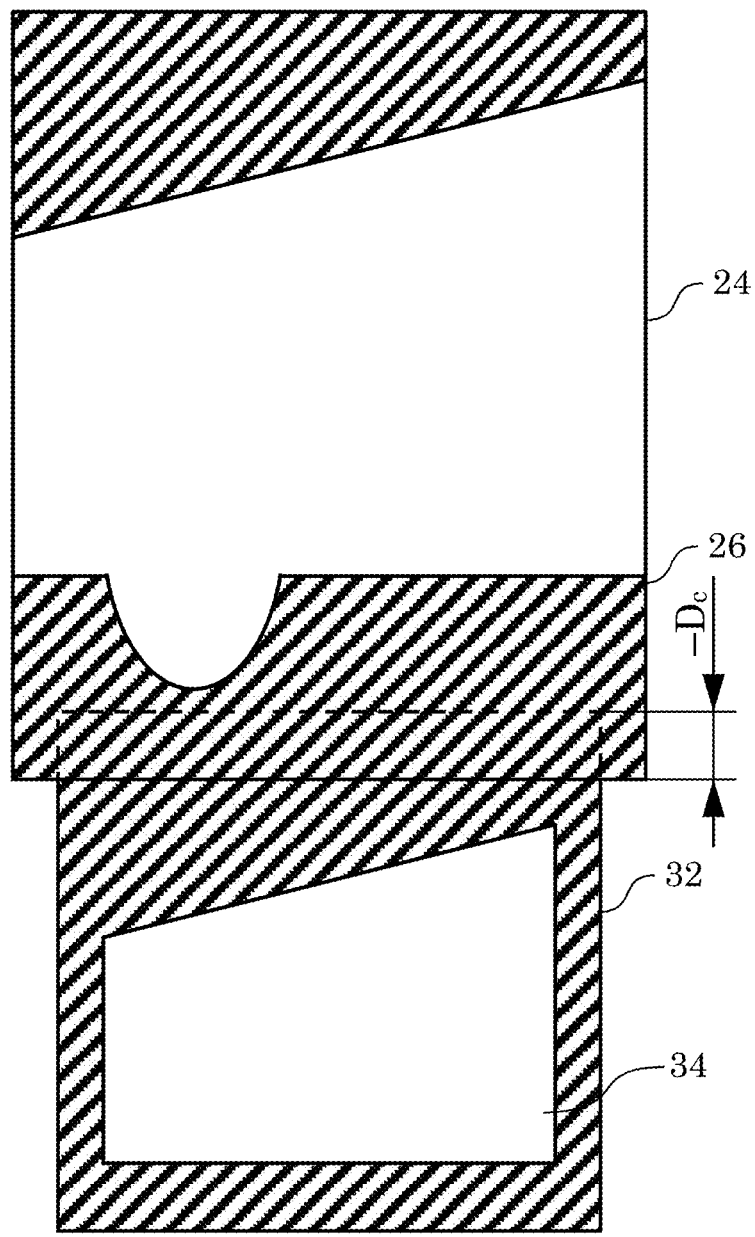
FIG. 13B is a diagram showing another example of a distance between contents.

FIG. 13B is a diagram showing another example of the distance $D_c$ between contents.

As is apparent from comparing FIGS. 13A and 13B, if the widths of the non-display-target regions change, the value of $D_c$ found by using Formula (1) changes in accordance with the change in the widths of the non-display-target regions. Thus, the spacing between the display-target regions is not different between FIGS. 13A and 13B showing results of placement of two contents using $D_c$.

The reason of the above is as follows. Specifically, when the vertical width of the non-display-target region is increased by w, the position of the curve $W_{bgs}$ in, for example, FIG. 8 simply moves up by w, and the value of $i_{max}$ does not change. In this case, the value of $D_c$ decreases by w. As a result, even if the vertical widths of non-display-target regions increase or decrease, when the contents are placed with spacing of $D_c$, the spacing between the display targets is not affected by the increase or decrease of w.

Note that, as already described, when two contents are placed in an overlapping manner as shown in FIG. 13B, in order for a non-display-target region included in one content not to cover and hide a display-target region in the other content, it is desirable that the non-display-target region be located behind the display-target region or that the non-display-target region be transparent.

Figure 14:
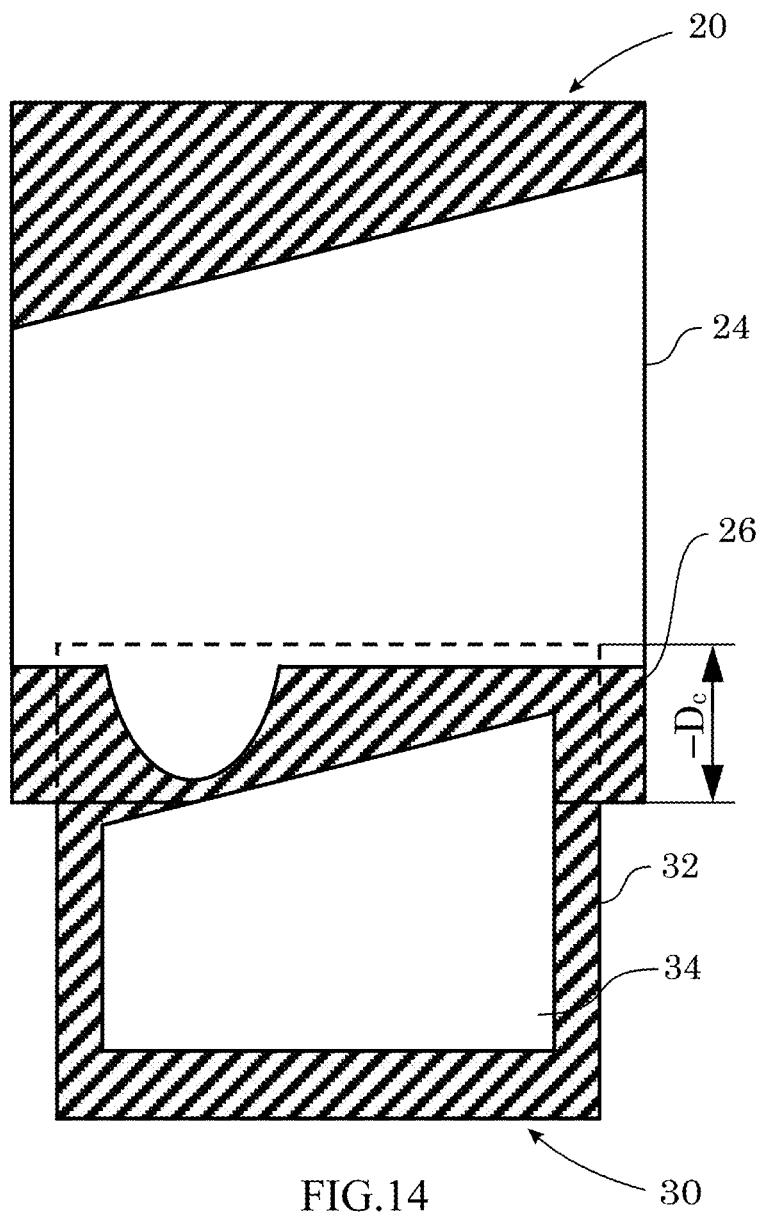
FIG. 14 is a diagram showing another example of a distance between contents.

FIG. 14 is a diagram showing another example of a distance between contents. As described with FIG. 12, the value of the content placement spacing $D_c$ is negative. The content 20 and the content 30 are placed using a $D_c$ with a negative value. As shown in FIG. 12, the spacing between the display-target region 24 and the display-target region 34 is equal to or larger than $F_{min}$ even at the narrowest location; thus, the display-target region 24 and the display-target region 34 do not overlap in such a case as well.

<Modification 1>

As a modification, there is a method of providing a lower-limit value of the content placement spacing $D_c$. A lower-limit value $D_{min}$ of the content placement spacing $D_c$ is set in advance. Then, when $D_c<D_{min}$, $D_c$ may be corrected to be $D_c=D_{min}$. For example, if $D_{min}$ is set to be $D_{min}>0$, no overlap occurs between contents.

<Modification 2>

As another modification, there is a method of providing an upper-limit value of the content placement spacing $D_c$. An upper-limit value $D_{max}$ of the content placement spacing $D_c$ is set in advance. Then, when $D_c>D_{max}$, $D_c$ may be corrected to be $D_c=D_{max}$. Setting $D_{max}$ allows contents not to be spaced too far from each other.

Figure 15A:
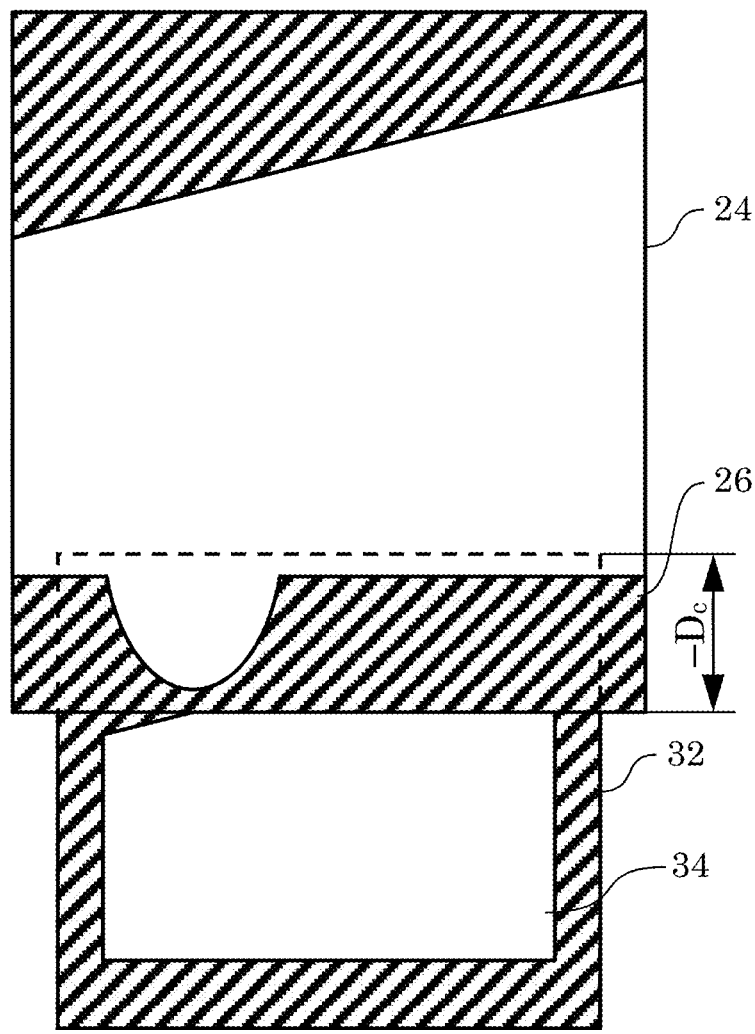
FIG. 15A is a diagram showing an example where a display target region of one content is hidden by a non-display-target region of another content.

FIG. 15A is a diagram showing an example where the display-target region 34 of one content is hidden by the non-display-target region 26 of the other content. In this way, depending on the display environment, there may be a case where the display-target region 34 of one content is hidden by the non-display-target region 26 of the other content.

Figure 15B:
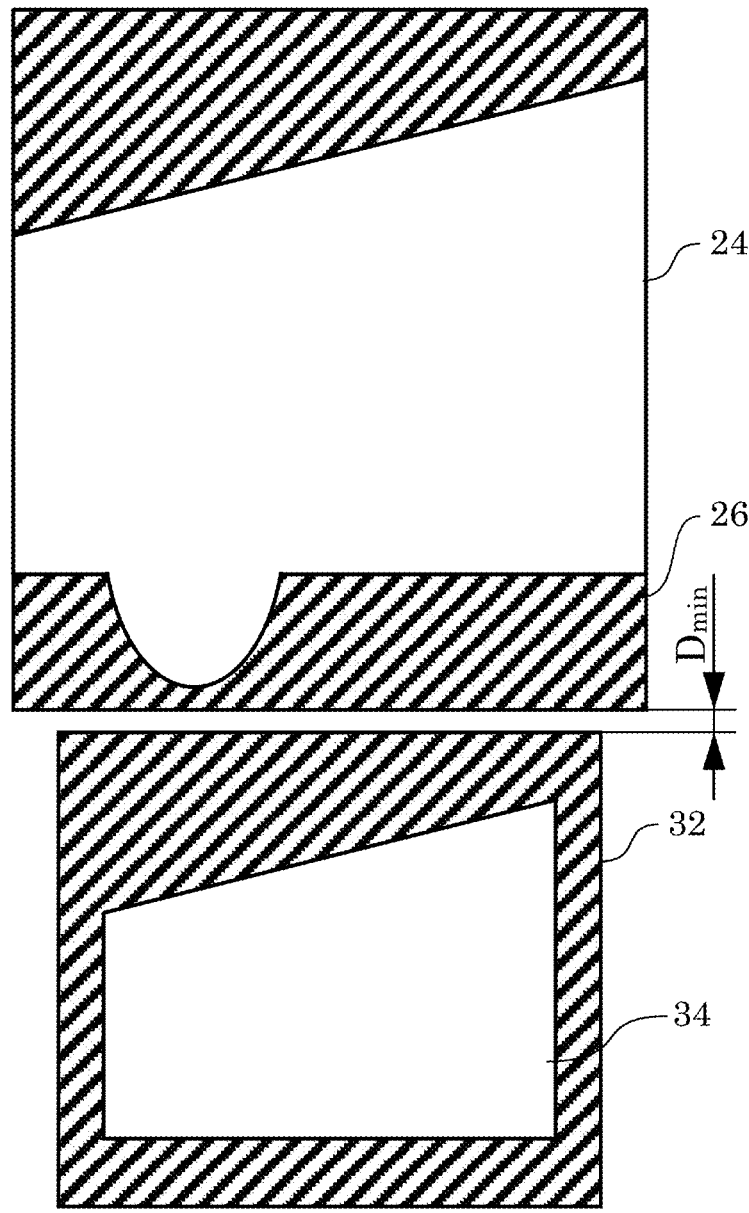
FIG. 15B is a diagram showing an example of setting a lower-limit value to a distance between contents.

FIG. 15B is a diagram showing an example where a lower-limit value of the distance between contents is set. In the display environment in FIG. 15A, setting the lower-limit value $D_{min}$ can prevent the display-target region 34 of one content from being hidden by the non-display-target region 26 of the other content, as shown in FIG. 15B.

Figure 16A:
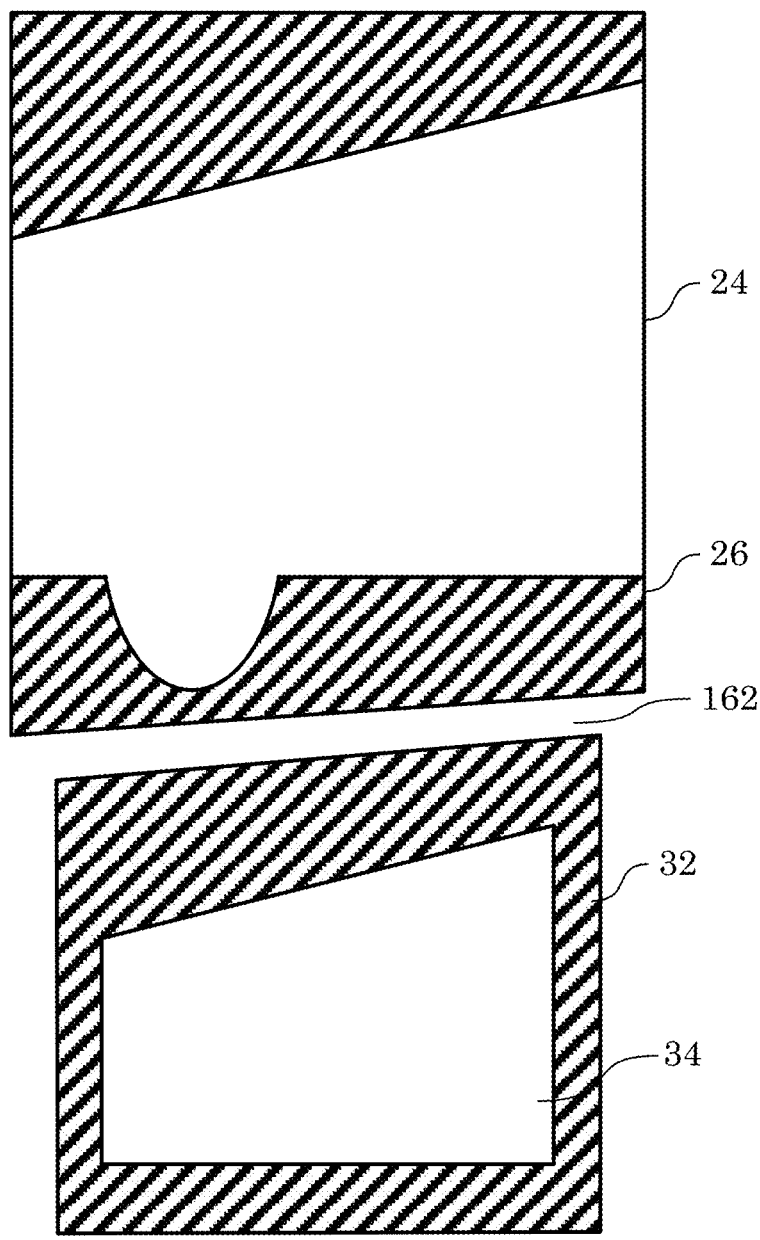
FIG. 16A is a diagram showing an example where the borders of contents are not horizontal.

FIG. 16A is a diagram showing an example where the borders of contents are not horizontal.

Figure 16B:
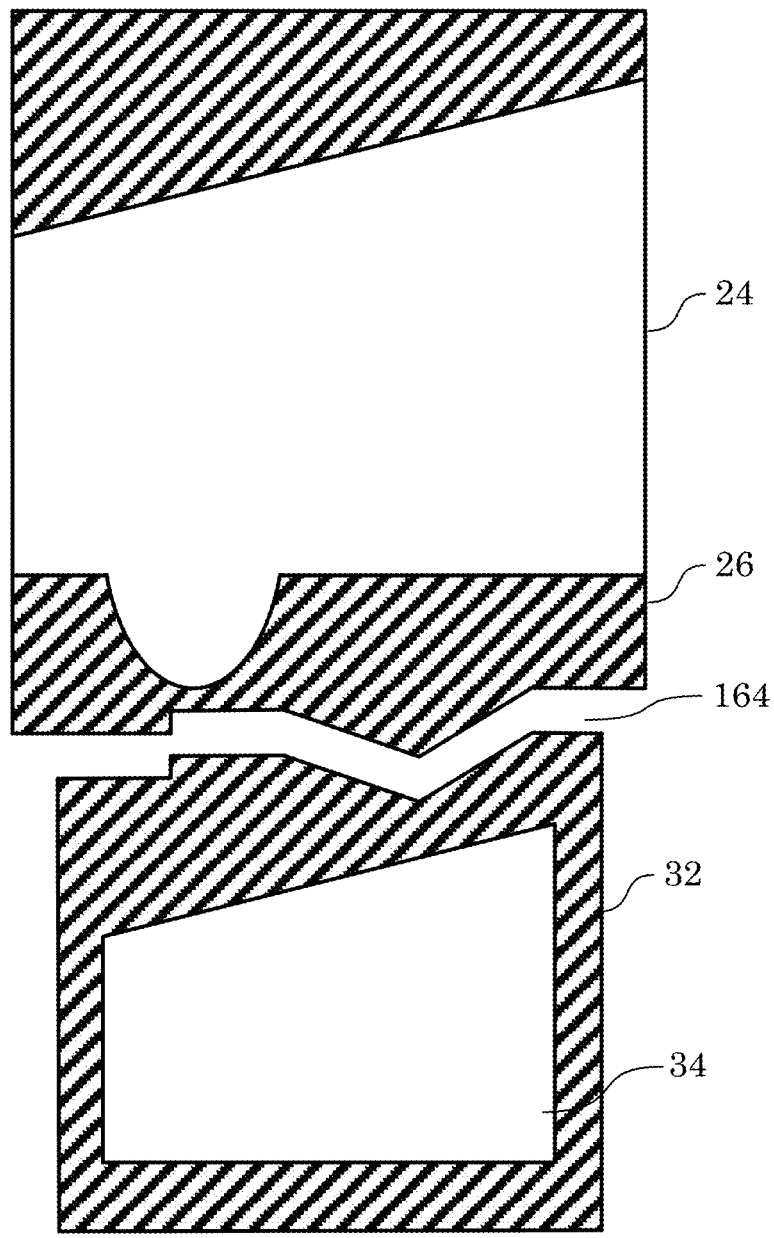
FIG. 16B is a diagram showing an example where the borders of contents have the same shape.

FIG. 16B is a diagram showing an example where the borders of contents have the same shape.

Even in a case where a border 162 or a border 164 between contents is not horizontal as shown in FIGS. 16A and 16B, the method of the embodiment described above can be used as long as the borders of the adjacent contents have approximately the same shape.

Figure 17:
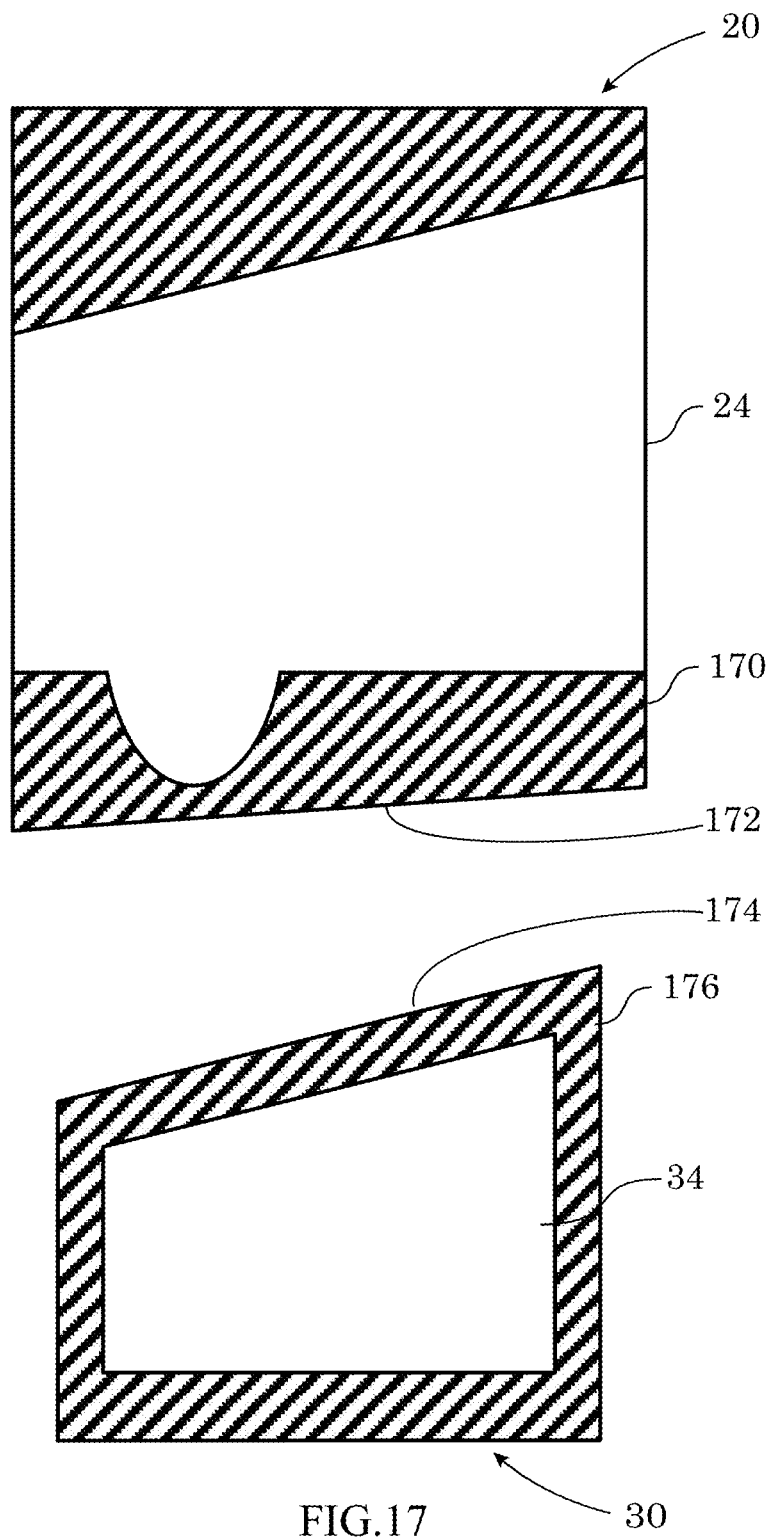
FIG. 17 is a diagram showing an example where the borders of contents do not have matching shapes.

FIG. 17 is a diagram showing a case where the shape of a border 172 of a non-display-target region 170 of the content 20 do not match the shape of a border 174 of a non-display-target region 176 of the content 30. In a case where the shapes of borders of contents do not match, the method of the embodiment described above can be used after correcting the shapes using an embodiment shown below.

FIGS. 18A, 18B, 18C, and 18D are diagrams showing examples of correcting the shape of the border of the content 20.

Figure 18A:
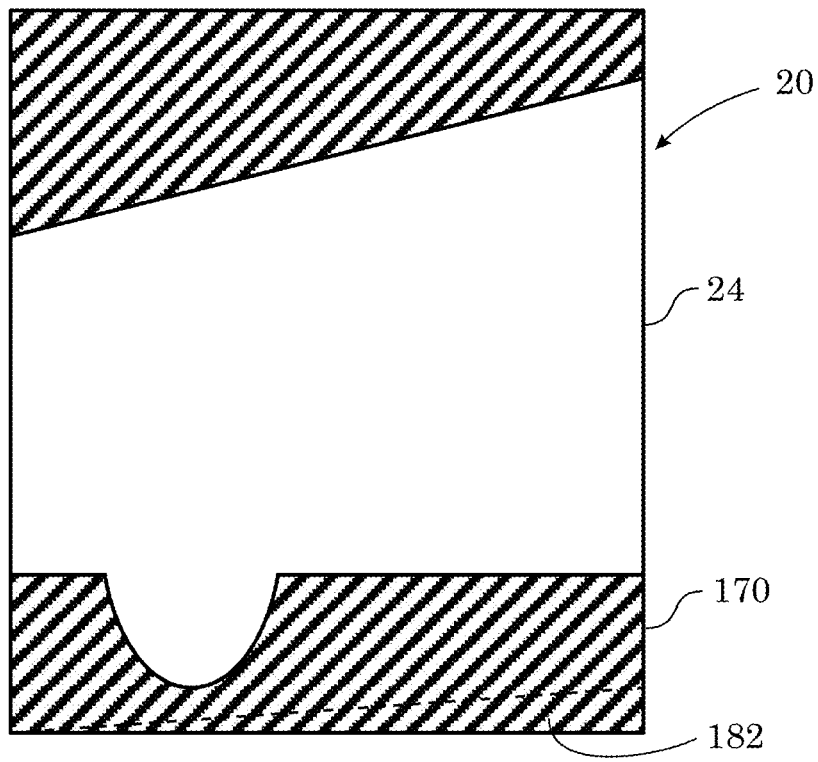
FIG. 18A is a diagram showing an example of correcting the shape of a border of a content 20.

FIG. 18A shows an example of adding a region 182 to the non-display-target region 170 to make the border of the content 20 horizontal.

Figure 18B:
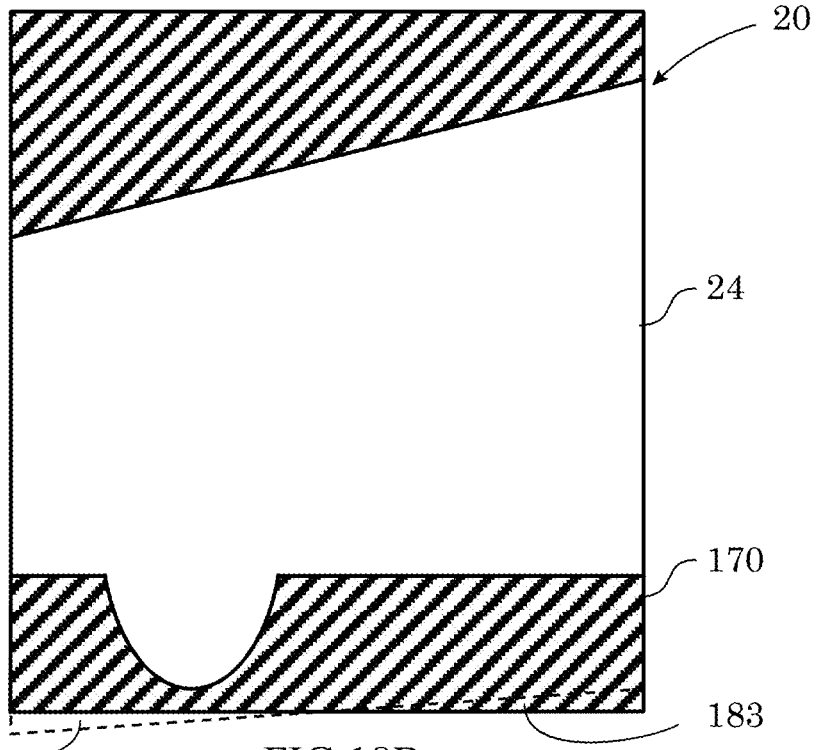
FIG. 18B is a diagram showing an example of correcting the shape of the border of the content 20.

FIG. 18B shows an example of adding a region 183 to the non-display-target region 170 and removing a region 184 from the non-display-target region 170 to make the border of the content 20 horizontal.

Figure 18C:
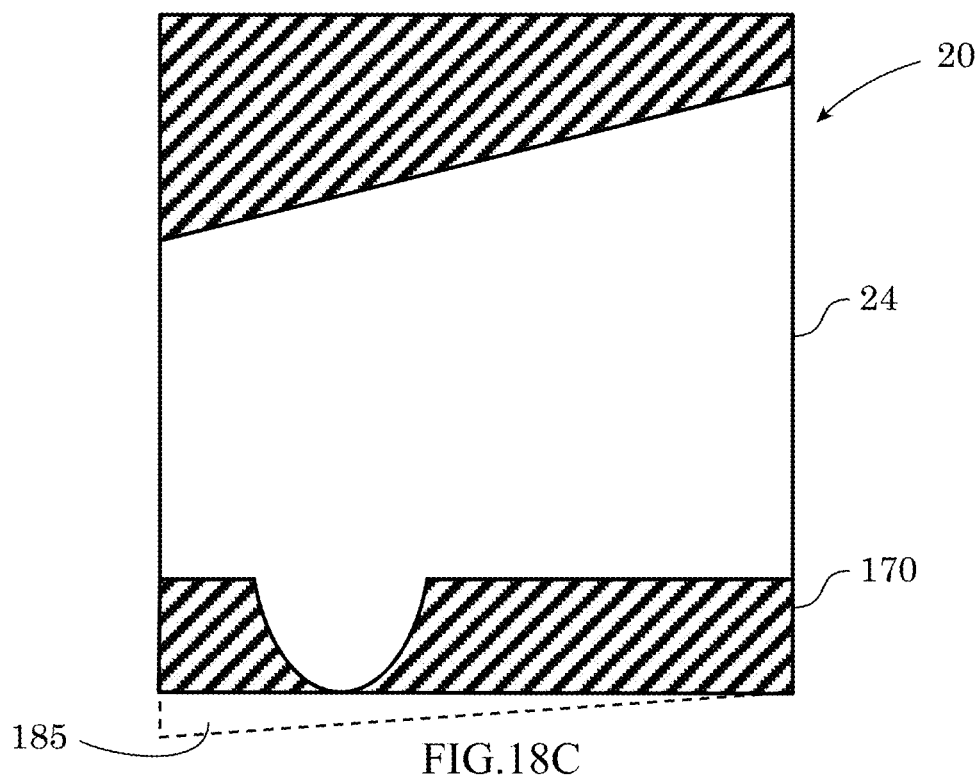
FIG. 18C is a diagram showing an example of correcting the shape of the border of the content 20.

FIG. 18C shows an example of removing a region 185 from the non-display-target region 170 to make the border of the content 20 horizontal.

Figure 18D:
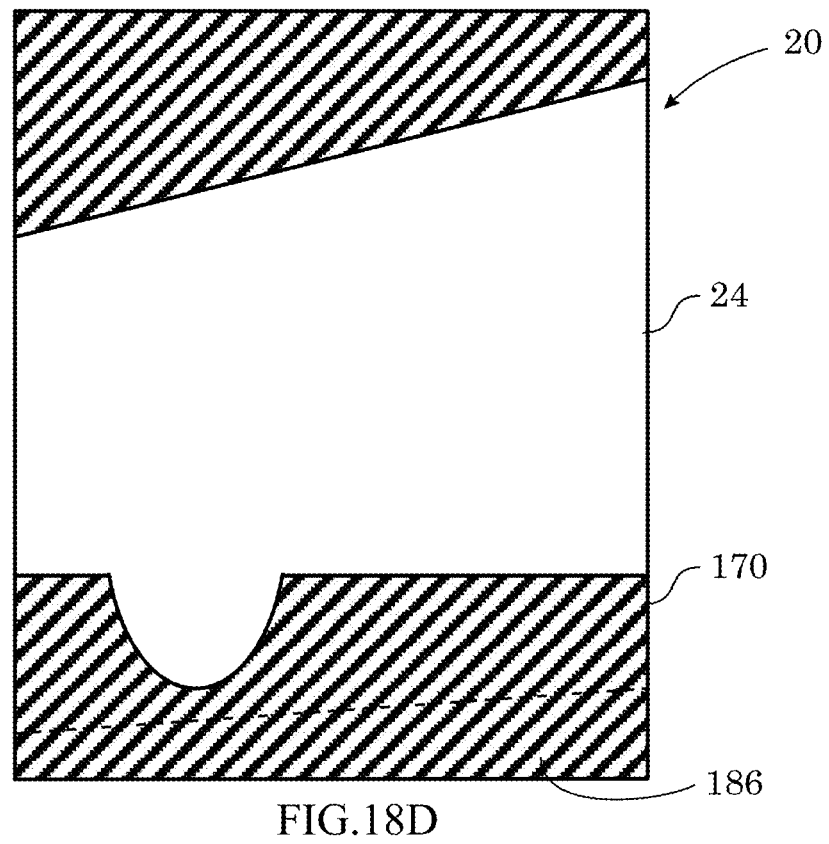
FIG. 18D is a diagram showing an example of correcting the shape of the border of the content 20.

FIG. 18D shows an example of adding a region 186 to the non-display-target region 170 to make the border of the content 20 horizontal.

FIGS. 19A, 19B, 19C, and 19D are diagrams showing examples of correcting the shape of the border of the content 30.

Figure 19A:
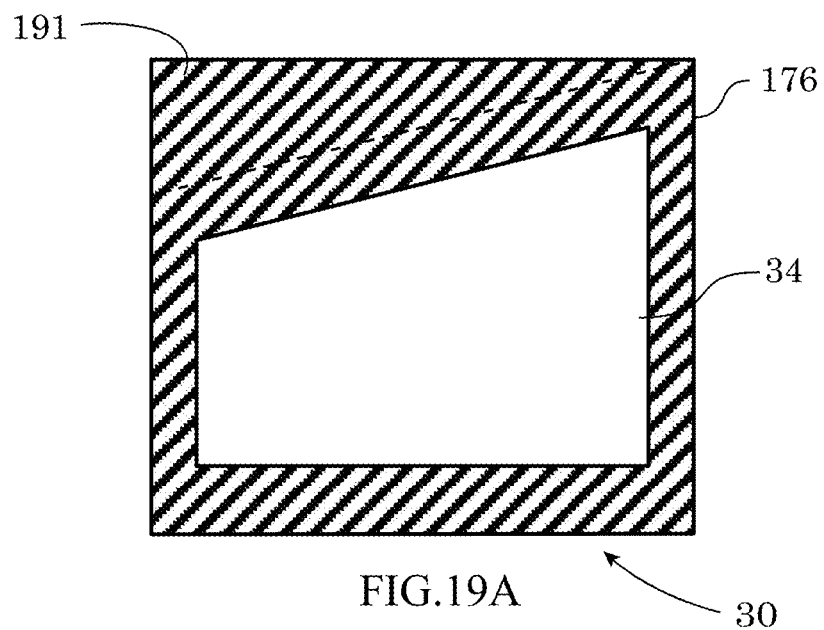
FIG. 19A is a diagram showing an example of correcting the shape of a border of a content 30.

FIG. 19A shows an example of adding a region 191 to the non-display-target region 176 to make the border of the content 30 horizontal.

Figure 19B:
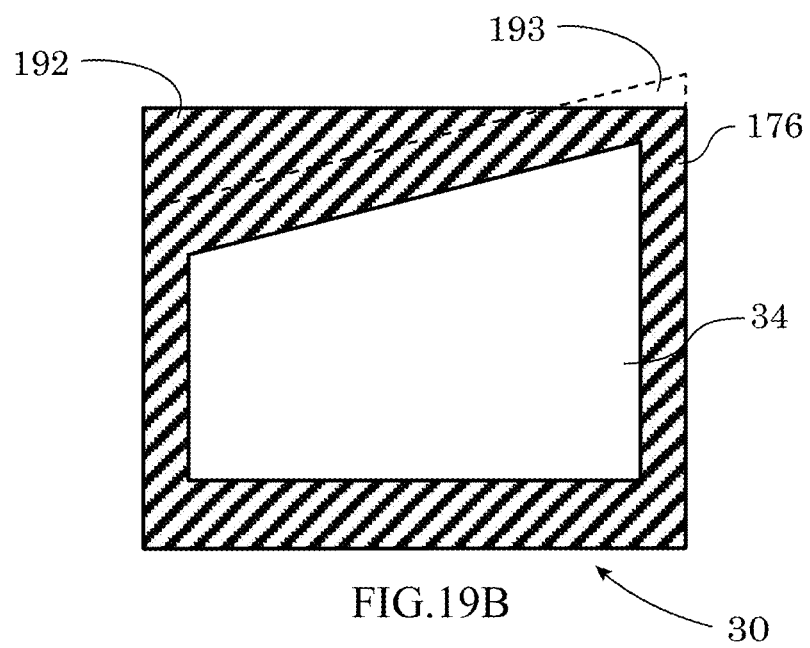
FIG. 19B is a diagram showing an example of correcting the shape of the border of the content 30.

FIG. 19B shows an example of adding a region 192 to the non-display-target region 176 and removing a region 193 from the non-display-target region 176 to make the border of the content 30 horizontal.

Figure 19C:
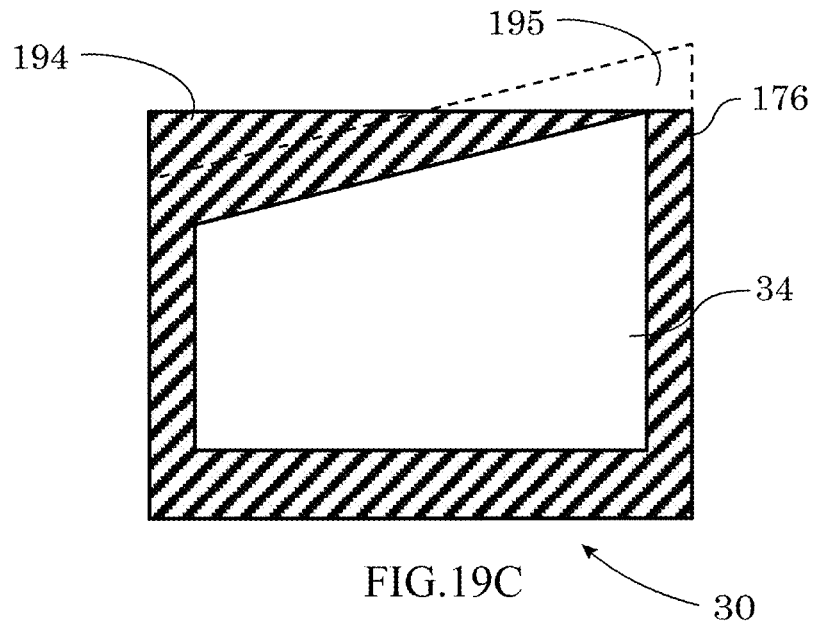
FIG. 19C is a diagram showing an example of correcting the shape of the border of the content 30.

FIG. 19C shows an example of adding a region 194 to the non-display-target region 176 and removing a region 195 from the non-display-target region 176 to make the border of the content 30 horizontal.

Figure 19D:
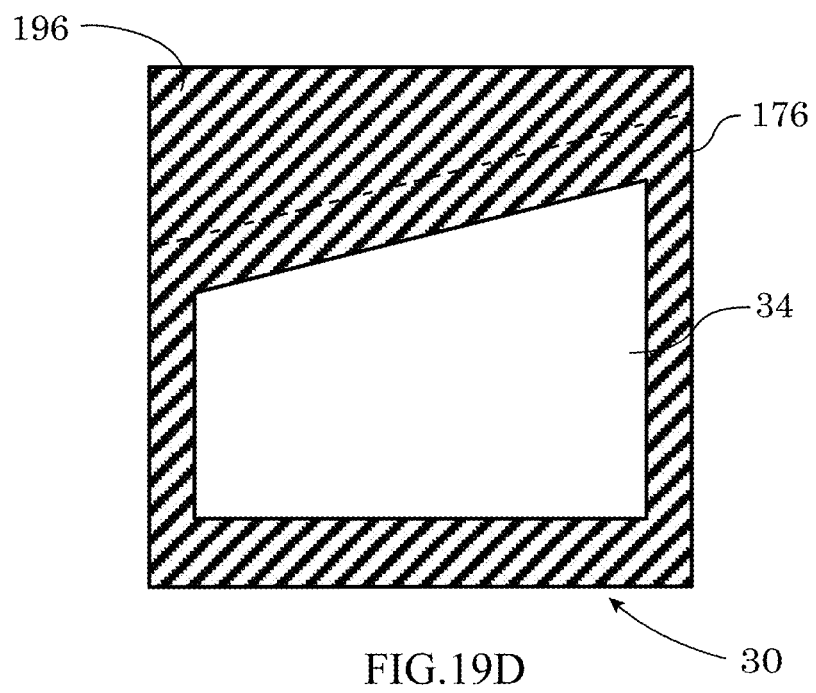
FIG. 19D is a diagram showing an example of correcting the shape of the border of the content 30.

FIG. 19D shows an example of adding a region 196 to the non-display-target region 170 to make the border of the content 30 horizontal.

By correcting the shapes of the borders of the content 20 and the content 30 in FIG. 17 as shown in FIGS. 18A to 19D, the method of the embodiment described above can be used. Any combination of the corrected contents shown in FIGS. 18A to 18D and the corrected contents shown in FIGS. 19A to 19D results in the same spacing between the two display-target regions when those two contents are placed, as shown in FIG. 13A or 13B.

FIGS. 20A, 20B, 20C, and 20D are diagrams showing an example of correcting only the shape of the border of the content 20 to make it match the shape of the border of the content 30.

Figure 20A:
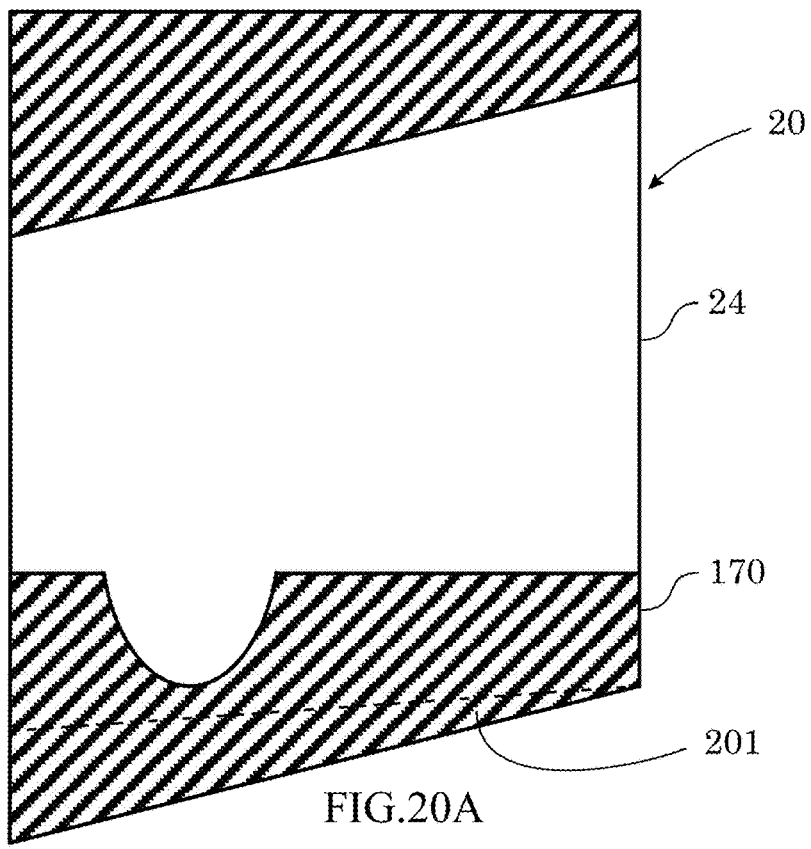
FIG. 20A is a diagram showing an example where only the shape of the border of the content 20 is corrected.

FIG. 20A shows an example of adding a region 201 to the non-display-target region 170 to make the border of the content 20 substantially the same as the border 174 of the content 30 in FIG. 17.

Figure 20B:
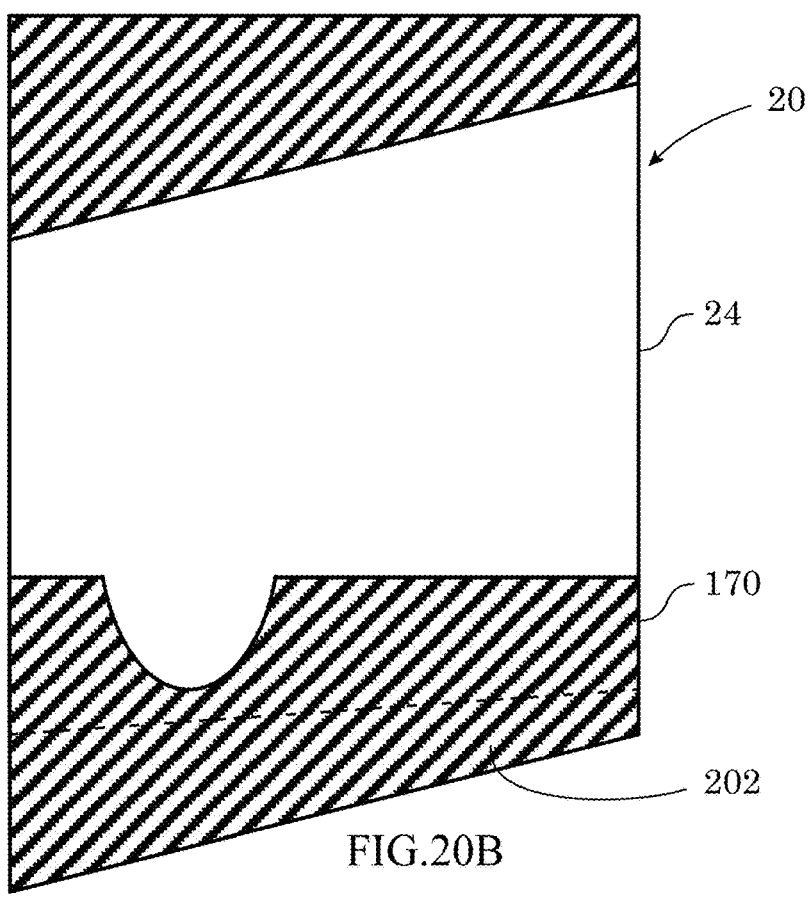
FIG. 20B is a diagram showing an example where only the shape of the border of the content 20 is corrected.

FIG. 20B shows an example of adding a region 202 to the non-display-target region 170 to make the border of the content 20 substantially the same as the border 174 of the content 30 in FIG. 17.

Figure 20C:
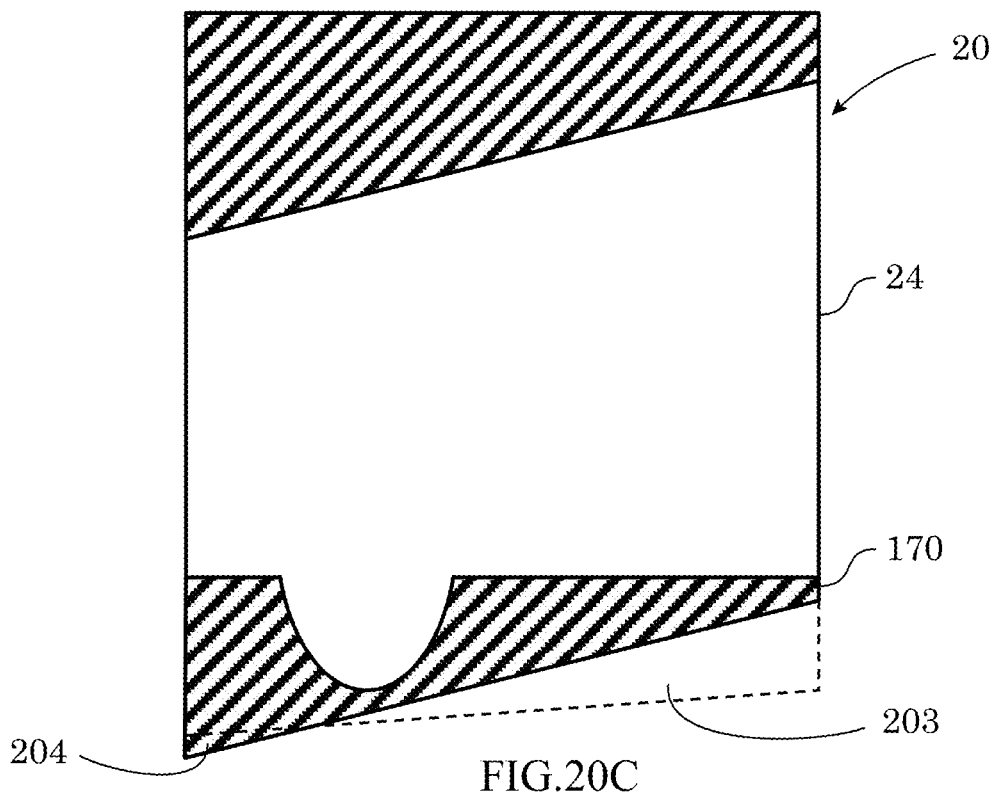
FIG. 20C is a diagram showing an example where only the shape of the border of the content 20 is corrected.

FIG. 20C shows an example of adding a region 204 to the non-display-target region 170 and removing a region 203 from the non-display-target region 170 to make the border of the content 20 substantially the same as the border 174 of the content 30 in FIG. 17.

Figure 20D:
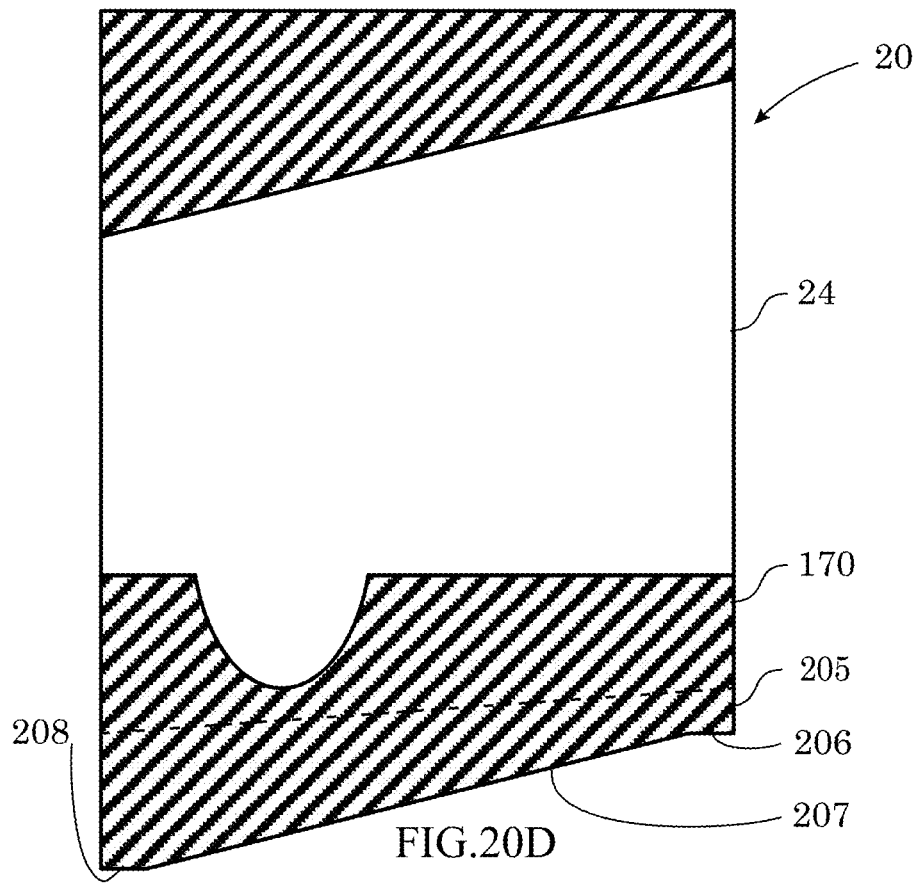
FIG. 20D is a diagram showing an example where only the shape of the border of the content 20 is corrected.

FIG. 20D shows an example of adding a region 205 to the non-display-target region 170 to make a border 207 of the content 20 substantially the same as the border 174 of the content 30 in FIG. 17. Note that in this case, a border 208 and a border 206 of the content 20 located outward of the width of the content 30 in FIG. 17 may be in any shape. This is because the shapes of the border 208 and the border 206 of the content 20 are the shapes of borders located outward of the content 30 in FIG. 17 and therefore do not contribute to the determination of the distance between the display-target region 24 and the display-target region 34.

Any combination of the content 30 in FIG. 17 and the corrected contents 20 in FIGS. 20A to 20D results in the same spacing between the display-target regions when those two contents are placed, as shown in FIGS. 13A and 13B.

<Modification 3>

The sizes of contents are not necessarily similar to one another and may be significantly different from each other. In such a case, the present method may be used after scaling up or down the contents. For example, assume a case where there is a mixture of a large content and a small content. If the small content is displayed small as is, the contents on the screen become unbalanced, making it difficult to view the contents. In such a case, the contents may be changed to sizes easily viewable to a user by applying scale up/down to the contents. However, if the contents are scaled up or down so that all the contents may be in the same size, a small content may be scaled up too much, which possibly makes it hard to view the content. In such a case, a limit may be set for a scale factor to make an adjustment so that the contents are balanced and easy to view. The method of the present disclosure may be used after contents are thus scaled up or down suitably.

<Modification 4>

The shapes of the non-display-target regions of contents may be changed dynamically. For example, a speech bubble (and text thereinside) may be changed in size in accordance with the size of the display screen. In this case, the display-target region or the non-display-target region changes in shape as well. Thus, the distance $D_c$ may be determined in accordance with a change in the shape of the display-target region or the non-display-target region.

<Processing Flow>

Figure 21:
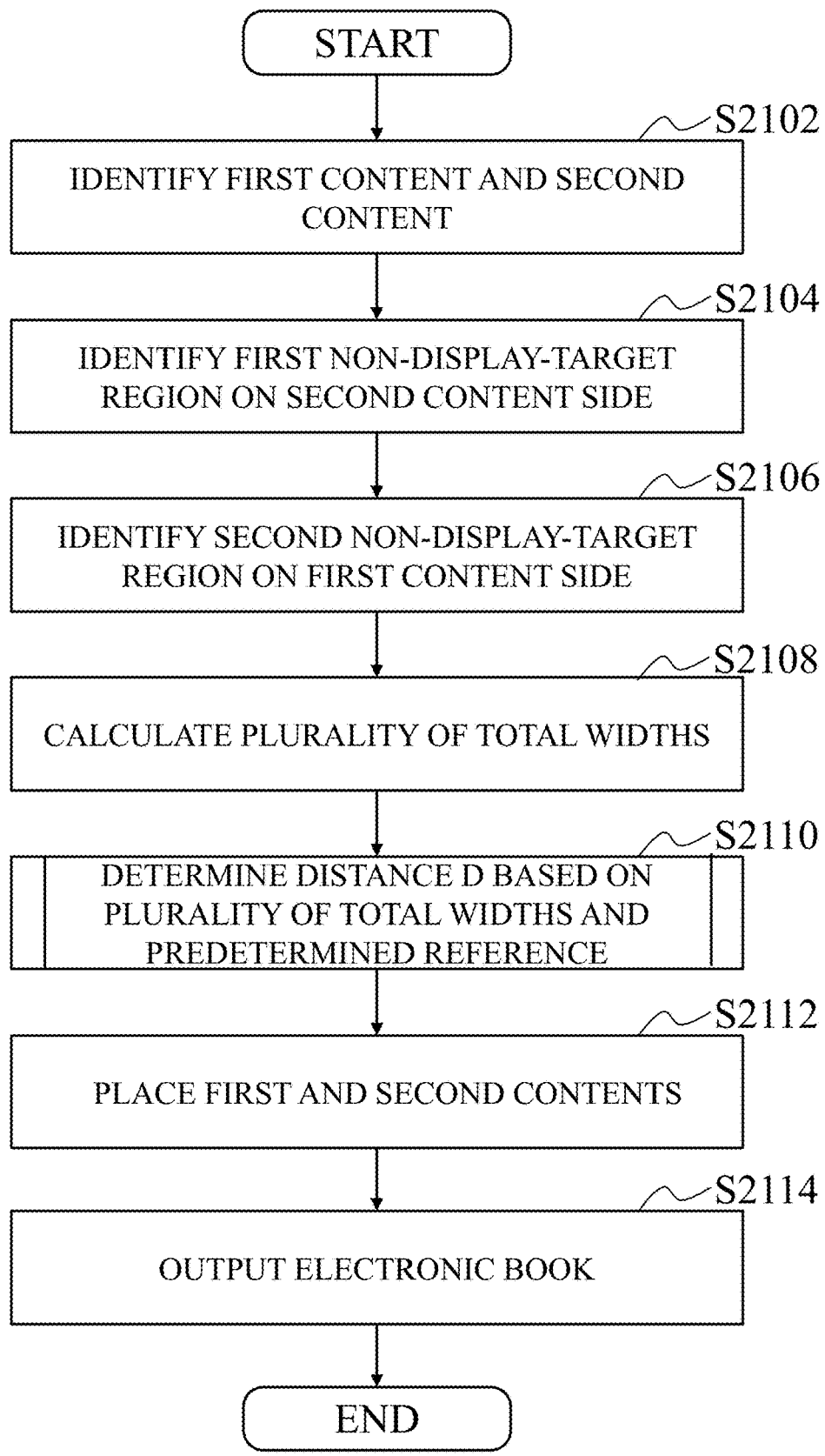
FIG. 21 is a diagram showing an example processing flow of an embodiment.

FIG. 21 is a diagram showing an example processing flow of the embodiment. An overview of the processing flow of the embodiment is described below. The processing flow is executed by a computer.

[Step S2102] A first content and a second content are identified. Each of these contents include a display-target region and a non-display-target region.

[Step S2104] A first non-display-target region located on the second content side is identified.

[Step S2106] A second non-display-target region located on the first content side is identified.

[Step S2108] A plurality of total widths are calculated. Specifically, as described with FIG. 4A, a total width means, for example, a width $W_{bg}(x_1)$ calculated using the formula $W_{bg}(x_1) = w_{a1} + w_{b1}$.

[Step S2110] A distance D between the contents is determined based on the plurality of total widths and a predetermined reference. For example, the distance is determined by the following Formula (1) as already described.

$$D_c = D_{std}(i_{max}) - W_{bgs}(i_{max}) \qquad \text{Formula (1)}$$

Details of this step will be described later.

[Step S2112] The first and second contents are placed. The distance $D_c$ already determined is used as the spacing between these two contents.

[Step S2114] An electronic book is outputted. The electronic book is displayed by a mobile terminal or the like.

Note that the above steps may be executed by a computer that generates electronic books. The electronic book generated may be, for example, distributed to a mobile terminal or the like via a network or may be delivered via a storage medium. A mobile terminal displays the contents on the screen using electronic book information including the plurality of contents and the distances between the plurality of contents.

Alternatively, the above steps may be executed by a mobile terminal that displays the electronic book. In this case, the electronic book does not have to include the distances between the contents. The distances between the contents may be determined by, e.g., a mobile terminal including a display screen. Alternatively, a mobile terminal may perform the above-described steps and determine new distances between the contents by replacing the distances between the contents in the electronic book information including the distances between the contents.

The distance D described in the above steps can be changed by changing, for example, the value of $F_{range}$, the shape of the curve $D_{std}$ 72 as a reference, $F_{min}$, $F_{max}$, or the like described with FIG. 7 based on an instruction from an operator or the like. Alternatively, the distance described in the above steps can be changed by setting the lower-limit value $D_{min}$ of the distance between contents described in Modification 1 or the upper-limit value $D_{max}$ of the distance between contents described in Modification 2 based on an instruction from an operator or the like.

Alternatively, as described in Modification 3, contents may be scaled up or down. Also, as described in Modification 4, in a case where the shape of a non-display-target region of a content dynamically changes, the distance D may be changed in accordance with the dynamically changing shape.

Figure 22:
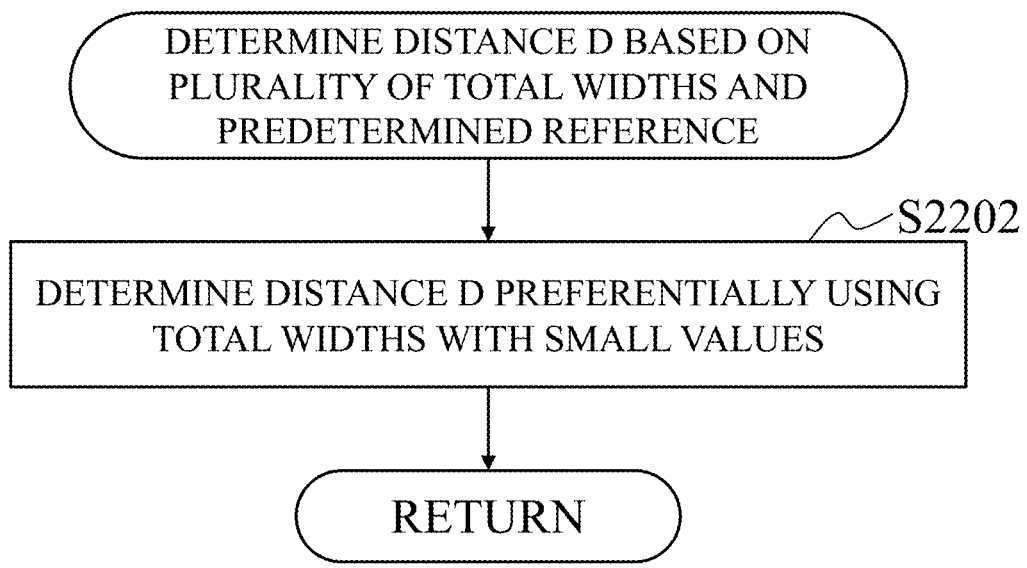
FIG. 22 is a diagram showing an example processing flow of determining a distance between contents.

FIG. 22 is a diagram showing an example processing flow of determining a distance D between contents.

[Step S2202] The distance D is determined prioritizing total widths with small values. For example, as described with FIG. 7, this step is executed considering and using total widths $W_{bg}$ with small values in a range from zero to $F_{range}$ to determine the distance $D_c$.

Figure 23:
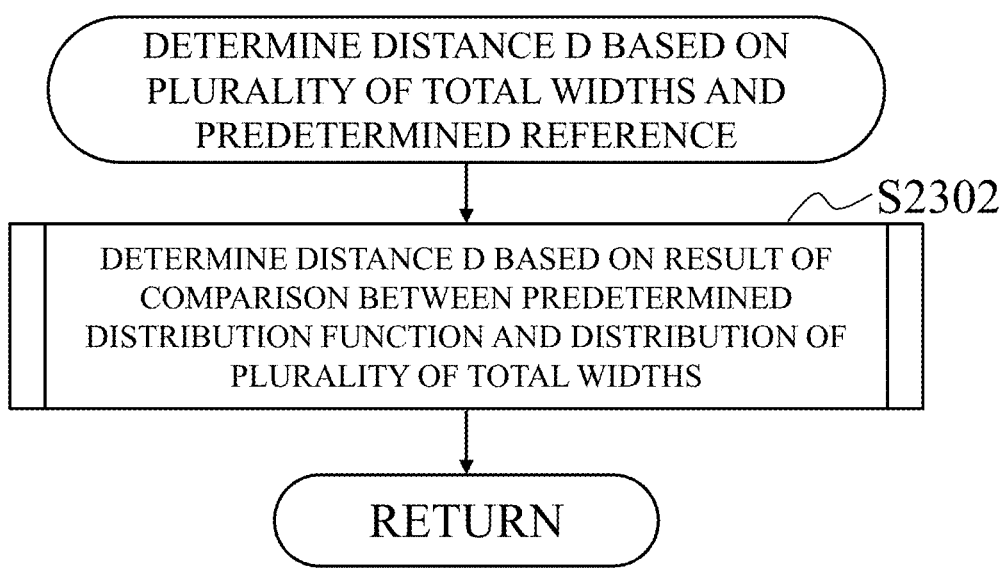
FIG. 23 is a diagram showing an example processing flow of determining the distance between contents.

FIG. 23 is a diagram showing an example processing flow of determining a distance between contents.

[Step S2302] The distance D is determined based on a result of comparing a predetermined distribution function and a distribution of a plurality of total widths. For example, as described using FIG. 7, the distance $D_c$ between contents can be determined by a comparison between the curve $D_{std}$ 72 which is a predetermined distribution function and a curve $W_{bgs}$ 74 which is a distribution of a plurality of total widths.

Figure 24:
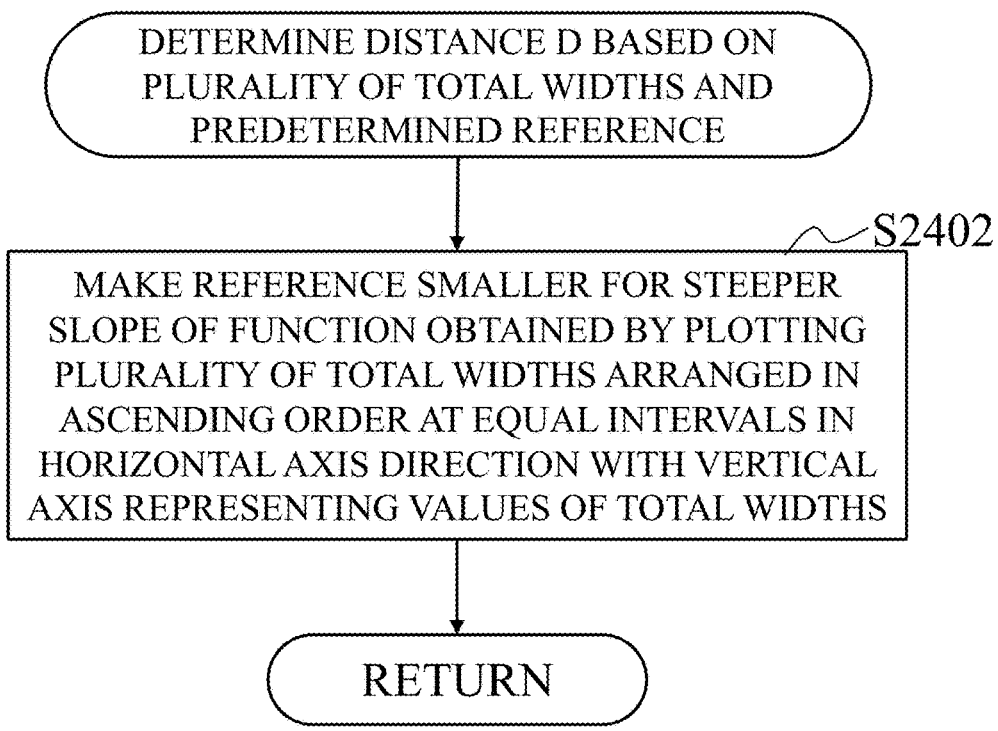
FIG. 24 is a diagram showing an example processing flow of determining the distance between contents.

FIG. 24 is a diagram showing an example processing flow of determining a distance between contents.

[Step S2402] The steeper is the slope of the function obtained by plotting a plurality of total widths arranged in ascending order at equal intervals in the direction of the horizontal axis with the vertical axis representing the values of the total widths, the smaller is the reference value. For example, as described using FIG. 5, the graph 52 is obtained which is a re-plot in which $W_{bgs}$ represents the total sums $W_{bg}$ sorted in ascending order of their values on a pixel basis and is set to the Y-axis, and the value of the index represents the order of the sorted values and is set to the X-axis.

Then, as described using FIG. 9, the example in FIG. 9 shows a state where the slope of $W_{bgs}$ is steep, and thus, the value of the index $i_{max}$ where $D_{std}-W_{bgs}$ is the largest is small, and the value of $D_{std}(i_{max})$ is also small. The value of this $D_{std}(i_{max})$ serves as a reference for determining the distance $D_c$.

Figure 25:
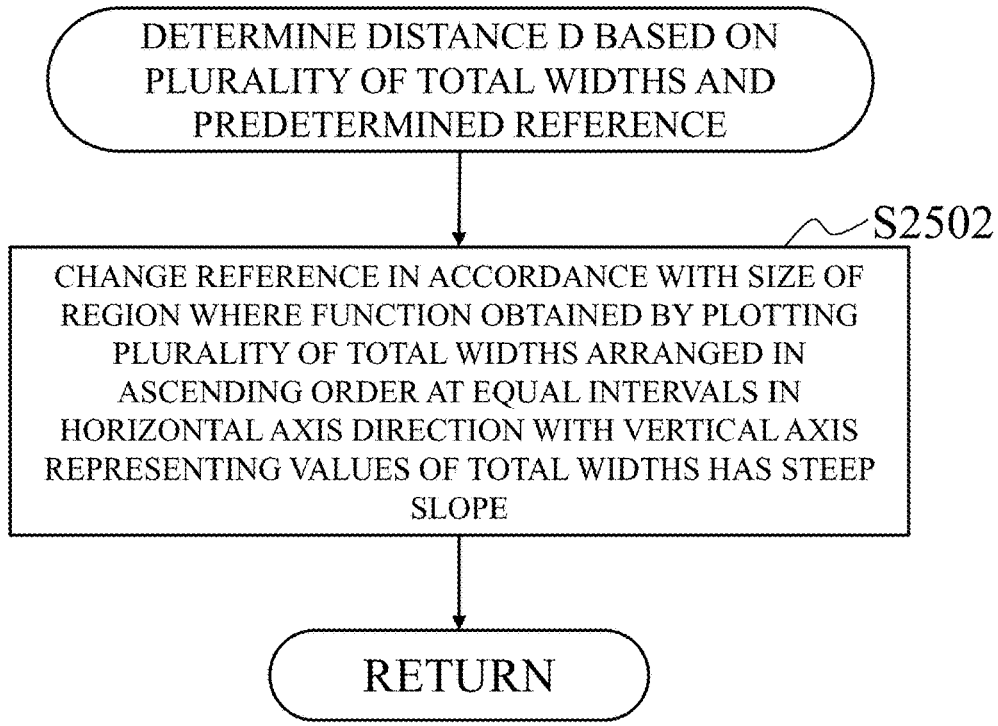
FIG. 25 is a diagram showing an example processing flow of determining the distance between contents.

FIG. 25 is a diagram showing an example processing flow of determining a distance between contents.

[Step S2502] The value of reference is changed in accordance with the size of a region where the function $W_{bgs}$ has a steep slope, the function $W_{bgs}$ being formed by plotting a plurality of total widths arranged in ascending order at equal intervals in the direction of the horizontal axis with the vertical axis representing the values of the total widths $W_{bg}$.

As described using FIG. 11, processing for when the projecting portion has a range smaller than $F_{range}$ is performed. In this case, the slope of a curve $W_{bgs}$ 114 becomes gentler as the index increases. In other words, in a case where the range of the projecting portion is smaller than $F_{range}$, the slope of $W_{bgs}$ is steep only in the region where the index is small, and the slope of $W_{bgs}$ is gentle in the region where the index is large. In this case, the value of $i_{max}$ is large, and the value of $D_{std}(i_{max})$ is large. Whether such a state occurs depends on the relative size of the range of the projecting portion (i.e., the size of the region of the projecting portion) compared to the value of $F_{range}$. The value of $D_{std}(i_{max})$ changes in accordance with this relative size. The value of this $D_{std}(i_{max})$ serves as a reference for determining the distance $D_c$.

Figure 26:
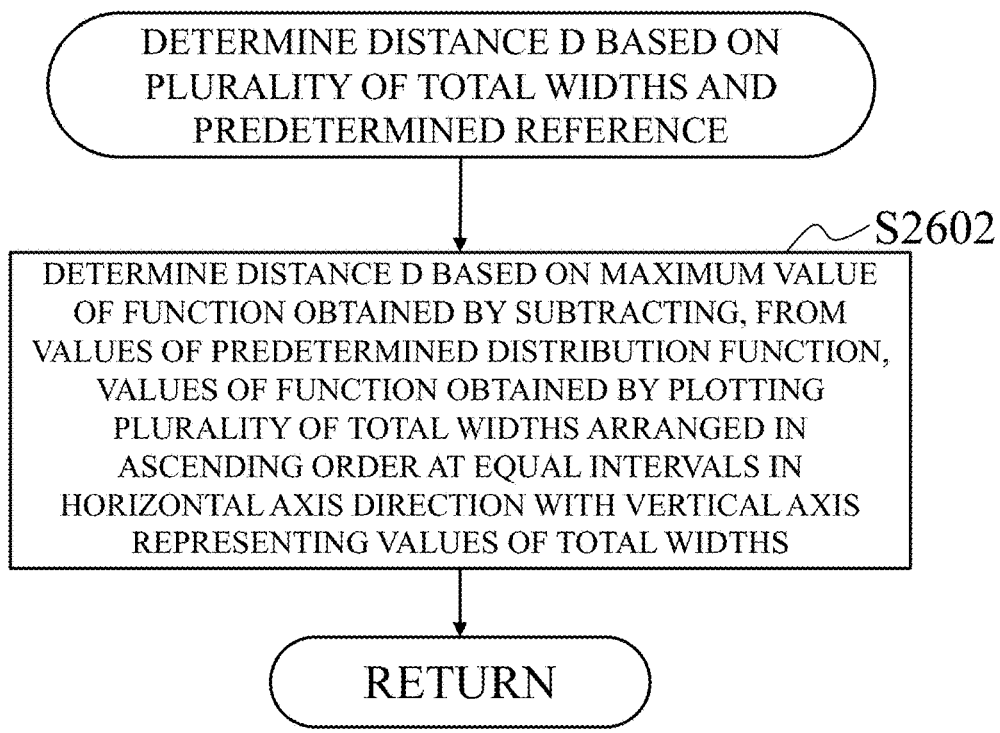
FIG. 26 is a diagram showing an example processing flow of determining the distance between contents.

FIG. 26 is a diagram showing an example processing flow of determining a distance between contents.

[Step S2602] The distance D is determined based on the maximum value of a function obtained by subtracting, from values of a predetermined distribution function, values of a function obtained by plotting a plurality of total widths arranged in ascending order at equal intervals in the direction of the horizontal axis with the vertical axis representing the values of the total widths.

As described with FIGS. 8 to 12, the index $i_{max}$ where a value $D_{std}-W_{bgs}$ is the largest is found, the value $D_{std}-W_{bgs}$ being obtained by subtracting, from values of the predetermined distribution function $D_{std}$, the function $W_{bgs}$ formed by plotting a plurality of total widths arranged in ascending order at equal intervals in the direction of the horizontal axis with the vertical axis representing the values of the total widths. Then, the value of $D_{std}(i_{max})$ at the value of this $i_{max}$ is used as a reference for determining the distance $D_c$.

Figure 27:
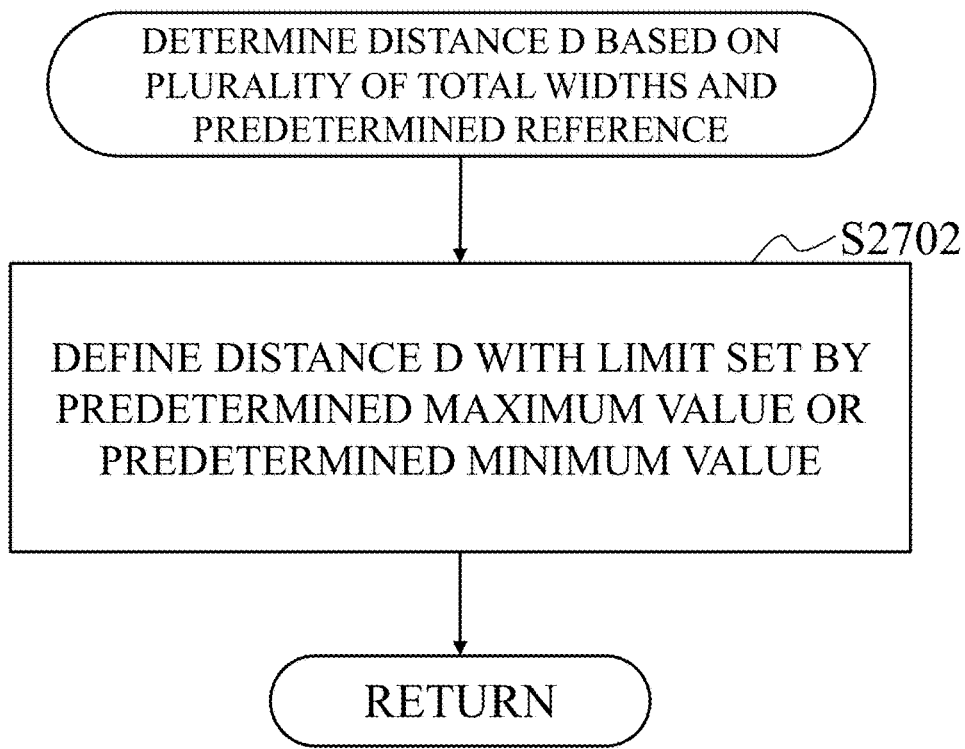
FIG. 27 is a diagram showing an example processing flow of determining the distance between contents.

FIG. 27 is a diagram showing an example processing flow of determining a distance between contents.

[Step S2702] The distance D is defined by a limit set by a predetermined maximum value or a predetermined minimum value.

As described in Modification 1 and FIG. 15B, setting a lower-limit value $D_{min}$ of the distance between contents can prevent the display-target region 34 of one content from being hidden by the non-display-target region 26 of the other content.

Also, as described in Modification 2, an upper-limit value $D_{max}$ of the content placement spacing $D_c$ may be set in advance. Setting $D_{max}$ allows the contents not to be spaced too far from each other.

Figure 28:
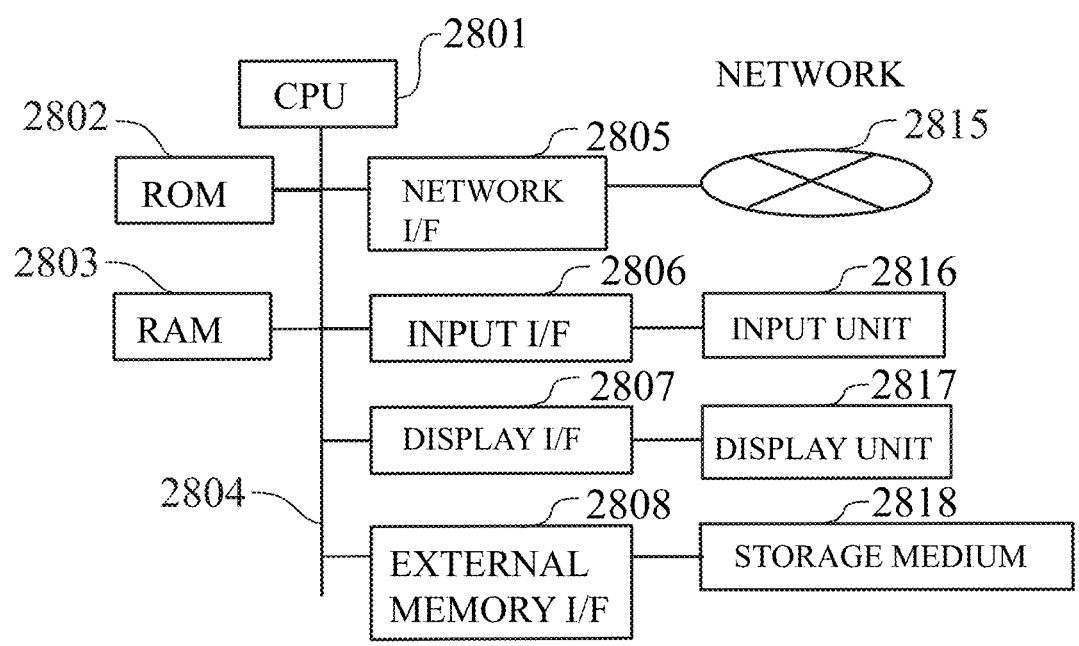
FIG. 28 is a diagram showing an example hardware configuration of the embodiment.

FIG. 28 is a diagram showing an example hardware configuration of the embodiment.

The hardware configuration has a CPU 2801, a ROM 2802 and a RAM 2803 in which programs and data of the present embodiment are stored, a network interface 2805, an input interface 2806, a display interface 2807, and an external memory interface 2808. These pieces of hardware are connected to one another by a bus 2804.

The network interface 2805 is connected to a network 2815. The network 2815 may be, e.g., a wired LAN, a wireless LAN, the Internet, or a telephone network. An input unit 2816 is connected to the input interface 2806. A display unit 2817 is connected to the display interface 2807. A storage medium 2818 is connected to the external memory interface 2808. The storage medium 2818 may be, e.g., a RAM, a ROM, a CD-ROM, a DVD-ROM, a hard disk, a memory card, or a USB memory drive.

Figure 29:
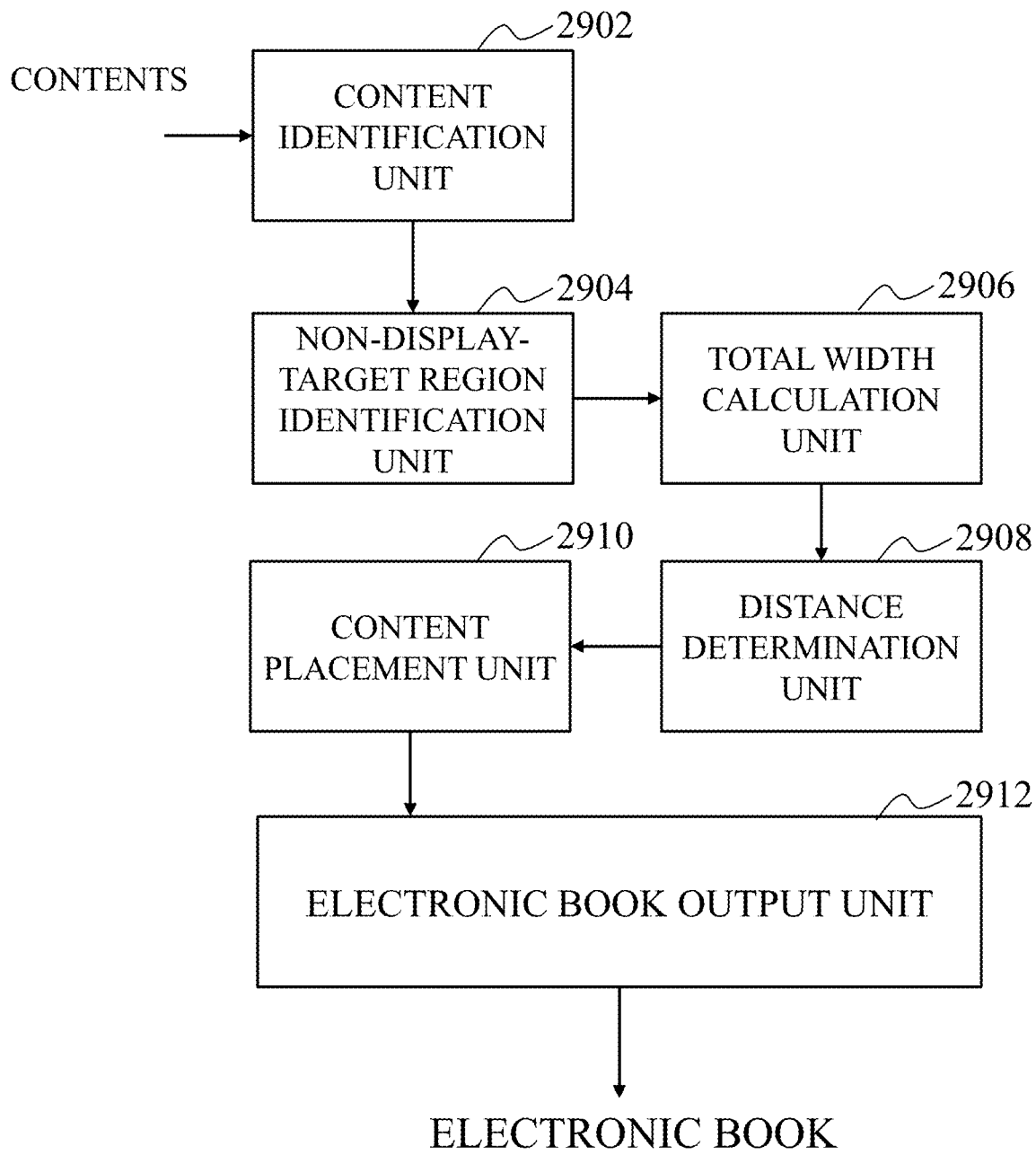
FIG. 29 is a diagram showing an example of a processing block diagram of the embodiment.

FIG. 29 is a diagram showing an example processing block diagram of the embodiment.

The processing shown below may be implemented by a computer that generates electronic books or by a mobile terminal that has received contents.

A content identification unit 2902 receives a plurality of contents and identifies each of the plurality of contents.

A non-display-target region identification unit 2904 identifies non-display-target regions included in the contents.

A total width calculation unit 2906 calculates total widths $W_{bg}$ of the non-display-target regions of two adjacent contents in the Y-axis direction (e.g., the content scrolling direction).

A distance determination unit 2908 determines the distance $D_c$ between two adjacent contents. Various embodiments and modifications for determining the distance $D_c$ have already been described using the drawings.

A content placement unit 2910 places contents using the distances $D_c$ between the contents determined. Note that it is also possible to only store the distances $D_c$ between the contents in electronic book data in association with the respective contents. When the electronic book is displayed on a display device, the contents may be placed on a display screen using these distances $D_c$ between the contents. Note that, as already described, in a case where the size of a display target dynamically changes, the distance $D_c$ between contents may be changed in accordance with the change. Also, the distance $D_c$ between contents may be provided with an upper-limit value $D_{max}$ or a lower-limit value $D_{min}$.

An electronic book output unit 2912 outputs an electronic book including a plurality of contents placed at the distances $D_c$. The electronic book outputted may be stored in a storage medium. Alternatively, through a communication line, the electronic book may be distributed to a mobile terminal or the like having a display screen. Alternatively, an electronic book may be generated by a computer, such as a mobile terminal, that has a display device and receives a plurality of contents, and the electronic book thus generated may be displayed on the display device of the computer.

Programs for implementing the embodiment described above may be executed by a computer having the hardware configuration shown in FIG. 28. Also, the programs of the embodiment may be implemented as a method that a computer is caused to execute. The programs may be stored in, e.g., the ROM 2802, the RAM 2803, or the storage medium 2818 (a non-transitory storage medium) in FIG. 28.

The steps of the operation flows disclosed herein and in the drawings may be changed in order unless it causes inconsistency. Also, a plurality of steps may be executed at the same time. The steps may be implemented by execution of programs stored in memory. Also, some of the steps may be implemented by an operating system or hardware.

Also, the flows are not exclusive and may be combined unless it causes inconsistency.

The embodiment may be implemented as a hardware apparatus.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A method for generating electronic book data in which a computer places a first content and a second content on a display screen at a distance D along a Y-axis in an orthogonal coordinate system formed by an X-axis and the Y-axis orthogonal to each other, the first content including a first display target, the second content including a second display target, the method comprising:

identifying a first non-display-target region which is part of a non-display-target region obtained by excluding a region of the first display target from a region of the first content and which is located on the second content side;

identifying a second non-display-target region which is part of a non-display-target region obtained by excluding a region of the second display target from a region of the second content and which is located on the first content side;

calculating a plurality of total widths each of which is a sum of a width of the first non-display-target region in a direction of the Y-axis and a width of the second non-display-target region in the direction of the Y-axis, the widths being at a same X-coordinate;

determining the distance D based on a result of comparison between a predetermined distribution function which is predetermined independent of the two display targets and is not a constant function and a distribution of the plurality of total widths so that the spacing at the location where the two display targets are closest to each other is equal to or larger than a predetermined value to prevent from overlapping between the two display targets; and generating electronic book data including the first content and the second content that have said distance D.

2. The method according to claim 1, wherein
in the determining of the distance D, the distance D is determined preferentially using total widths with small values among the plurality of total widths.

3. The method according to claim 1, wherein
in the determining of the distance D, the distance D is determined based on a maximum value of a function obtained by subtracting, from values of a predetermined distribution function, values of a function obtained by plotting the plurality of total widths arranged in ascending order at equal intervals in a direction of a horizontal axis with a vertical axis representing values of the total widths.

4. The method according to claim 1, wherein
in the determining of the distance D, the distance D is defined by a limit set by a predetermined maximum value or a predetermined minimum value.

5. A non-transitory computer-readable medium storing a program that causes a computer to execute the method according to claim 1.

6. The method according to claim 1, wherein
in the determining of the distance D, the distance D is determined based on a maximum value of a function obtained by subtracting a distribution function of the plurality of total widths from the predetermined distribution function.

7. The method according to claim 1, wherein
the predetermined distribution function has the predetermined value corresponding to a minimum value among the plurality of total widths.

* * * * *